US012636889B2

(12) United States Patent
Nakamura

(10) Patent No.: US 12,636,889 B2
(45) Date of Patent: May 26, 2026

(54) LIQUID EJECTING DEVICE

(71) Applicant: SEIKO EPSON CORPORATION, Tokyo (JP)

(72) Inventor: Chikashi Nakamura, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 338 days.

(21) Appl. No.: 18/414,686

(22) Filed: Jan. 17, 2024

(65) Prior Publication Data

US 2024/0246340 A1 Jul. 25, 2024

(30) Foreign Application Priority Data

Jan. 20, 2023 (JP) ................................ 2023-007151

(51) Int. Cl.
*B41J 2/17* (2006.01)
*B41J 2/165* (2006.01)
*B41J 29/17* (2006.01)

(52) U.S. Cl.
CPC ......... *B41J 2/1721* (2013.01); *B41J 2/16508* (2013.01); *B41J 2/16523* (2013.01); *B41J 29/17* (2013.01); *B41J 2002/16594* (2013.01); *B41J 2/1728* (2024.05); *B41J 2/1742* (2024.05)

(58) Field of Classification Search
CPC .. B41J 2/1721; B41J 2/16508; B41J 2/16523; B41J 29/17; B41J 2/1728; B41J 2/1742; B41J 2002/16594; B41J 2/185
See application file for complete search history.

(56) References Cited

U.S. PATENT DOCUMENTS

2009/0189944 A1* 7/2009 Shinoda ............... B41J 2/16585 347/32

FOREIGN PATENT DOCUMENTS

JP H11-320918 A 11/1999

* cited by examiner

*Primary Examiner* — Justin Seo

(74) *Attorney, Agent, or Firm* — WORKMAN NYDEGGER

(57) ABSTRACT

A liquid ejecting device on which a waste liquid storage unit is mounted includes an ejecting unit that ejects a liquid, a maintenance unit and a collecting unit. The maintenance unit includes a receiving unit and a wiping unit that wipes a nozzle surface in which a nozzle is open, by moving together with the receiving unit in one direction. The receiving unit includes a receiver including a receiving tank that receives the liquid discharged from the nozzle, and a receiving gutter in which a discharging hole for dropping the liquid received by the receiving tank onto the collecting unit is open. The collecting unit includes a discharging gutter that directs the liquid dropped through the discharging hole to the waste liquid storage unit, and the discharging gutter extends in the one direction and overlaps with at least a part of the receiver as viewed in a vertical direction.

7 Claims, 22 Drawing Sheets

LIQUID EJECTING DEVICE

The present application is based on, and claims priority from JP Application Serial Number 2023-007151, filed Jan. 20, 2023, the disclosure of which is hereby incorporated by reference herein in its entirety.

BACKGROUND

1. Technical Field

The present disclosure relates to a liquid ejecting device.

2. Related Art

JP-A-11-320918 describes a liquid ejecting device including an ejecting unit that ejects a liquid, a receiving unit that receives the liquid from the ejecting unit, and a flow path that is coupled to the receiving unit. The liquid ejecting device is configured to collect the liquid that is received by the receiving unit, via the flow path.

Such a liquid ejecting device generally includes a wiping unit that wipes the ejecting unit. When the wiping unit wipes the ejecting unit, the wiping unit moves with respect to the ejecting unit. In this state, when the receiving unit moves together with the wiping unit, the flow path is deformed. With this, there may be a risk that a flow of the liquid stagnates.

SUMMARY

In order to solve the above-mentioned problem, a liquid ejecting device on which a waste liquid storage unit is mounted includes an ejecting unit including a nozzle surface in which a nozzle is open and being configured to eject a liquid from the nozzle, a maintenance unit configured to perform maintenance to the ejecting unit, and a collecting unit configured to collect the liquid from the maintenance unit, wherein the maintenance unit includes a receiving unit configured to receive the liquid discharged from the nozzle, and a wiping unit configured to wipe the nozzle surface by moving together with the receiving unit in one direction, the receiving unit includes a receiver including a receiving tank configured to receive the liquid discharged from the nozzle, and a receiving gutter in which a discharging hole for dropping the liquid received by the receiving tank onto the collecting unit is open, the collecting unit includes a discharging gutter configured to receive the liquid dropped through the discharging hole and direct the liquid to the waste liquid storage unit, and the discharging gutter extends in the one direction and overlaps with at least a part of the receiver as viewed in a vertical direction.

DESCRIPTION OF EMBODIMENTS

An example of a liquid ejecting device is described below with reference to the drawings. The liquid ejecting device is, for example, an ink jet-type printer that performs printing of an image such as characters and photographs on a medium such as a sheet and fabric by ejecting ink, which is an example of a liquid.

Liquid Ejecting Device

Figure 1:
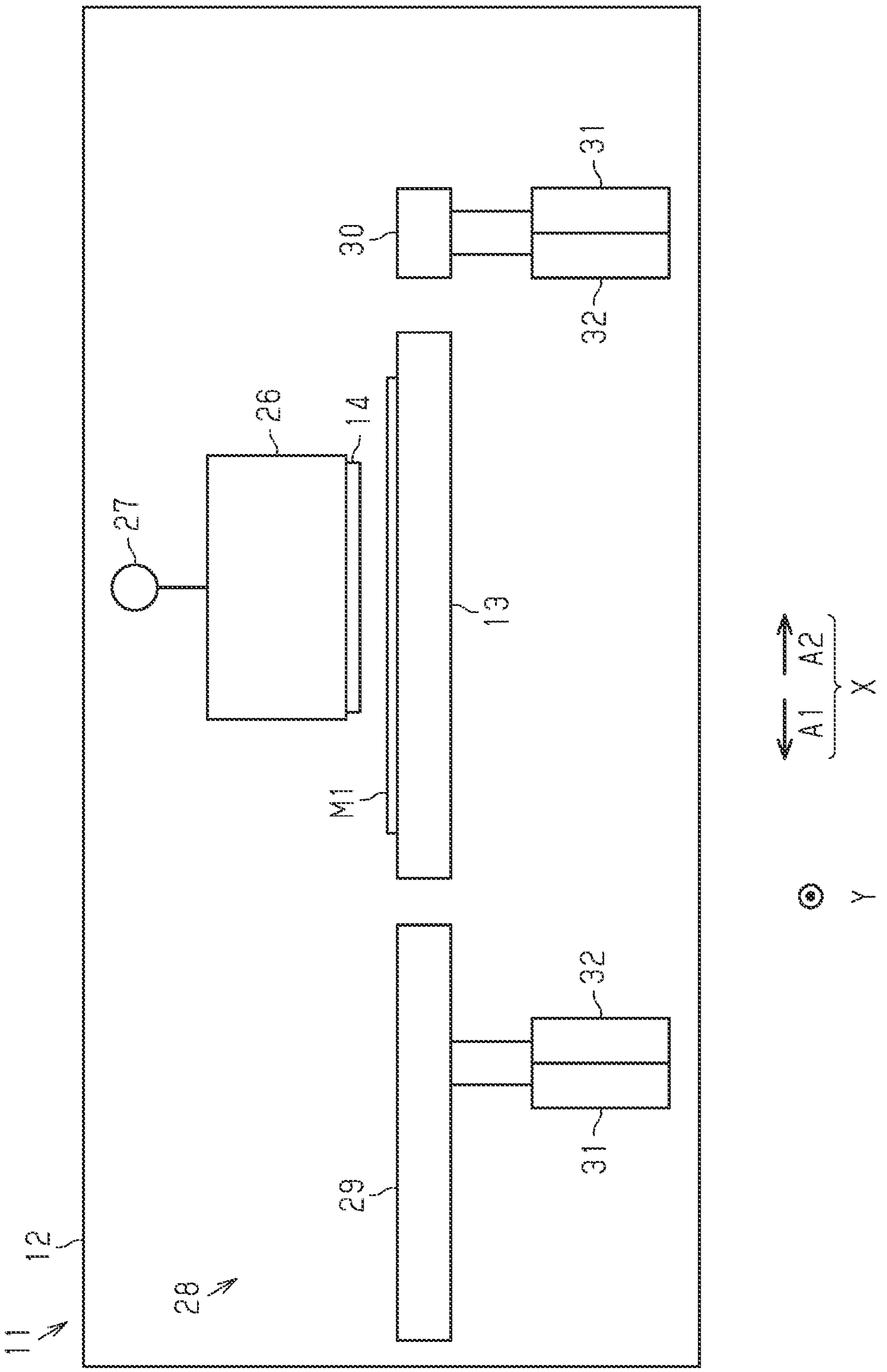
FIG. 1 is a front view illustrating an example of a liquid ejecting device.

As illustrated in FIG. 1, a liquid ejecting device 11 includes a housing 12.

The liquid ejecting device 11 includes a supporting unit 13. The supporting unit 13 supports a medium M1 being transported. The medium M1 is transported in a transport direction Y on the supporting unit 13.

The liquid ejecting device 11 includes an ejecting unit 14. The ejecting unit 14 is configured to eject a liquid. The ejecting unit 14 is located to face the supporting unit 13. The ejecting unit 14 ejects the liquid onto the medium M1 that is supported on the supporting unit 13.

The ejecting unit 14 performs scanning with respect to the medium M1. The ejecting unit 14 ejects the liquid onto the medium M1 while moving in a scanning direction X. Therefore, the liquid ejecting device 11 is a serial printer. The scanning direction X is a direction different from the transport direction Y. The scanning direction X indicates two directions including a first direction A1 and a second direction A2. The first direction A1 and the second direction A2 indicate directions opposite to each other.

The ejecting unit 14 may be configured to eject a plurality of types of liquids. For example, the ejecting unit 14 may be configured to eject a first liquid and a second liquid. The ejecting unit 14 may be configured to eject a third liquid in addition to the first liquid and the second liquid.

The first liquid and the second liquid are liquids that react with each other. The first liquid and the second liquid are mixed with each other to be cured. One of the first liquid and the second liquid is ink, and the other one is a reaction liquid. In one example, the first liquid is ink, and the second liquid is a reaction liquid. Specifically, the first liquid is pigment ink, and the second liquid is a curing liquid containing a component for aggregating the pigment. For example, the ejecting unit 14 ejects the first liquid onto the medium M1, and then ejects the second liquid. With this, the first liquid is easily fixed onto the medium M1. The third liquid is a liquid that does not react with the first liquid and the second liquid. For example, the third liquid is a coating liquid that coats the medium M1 after printing.

Figure 2:
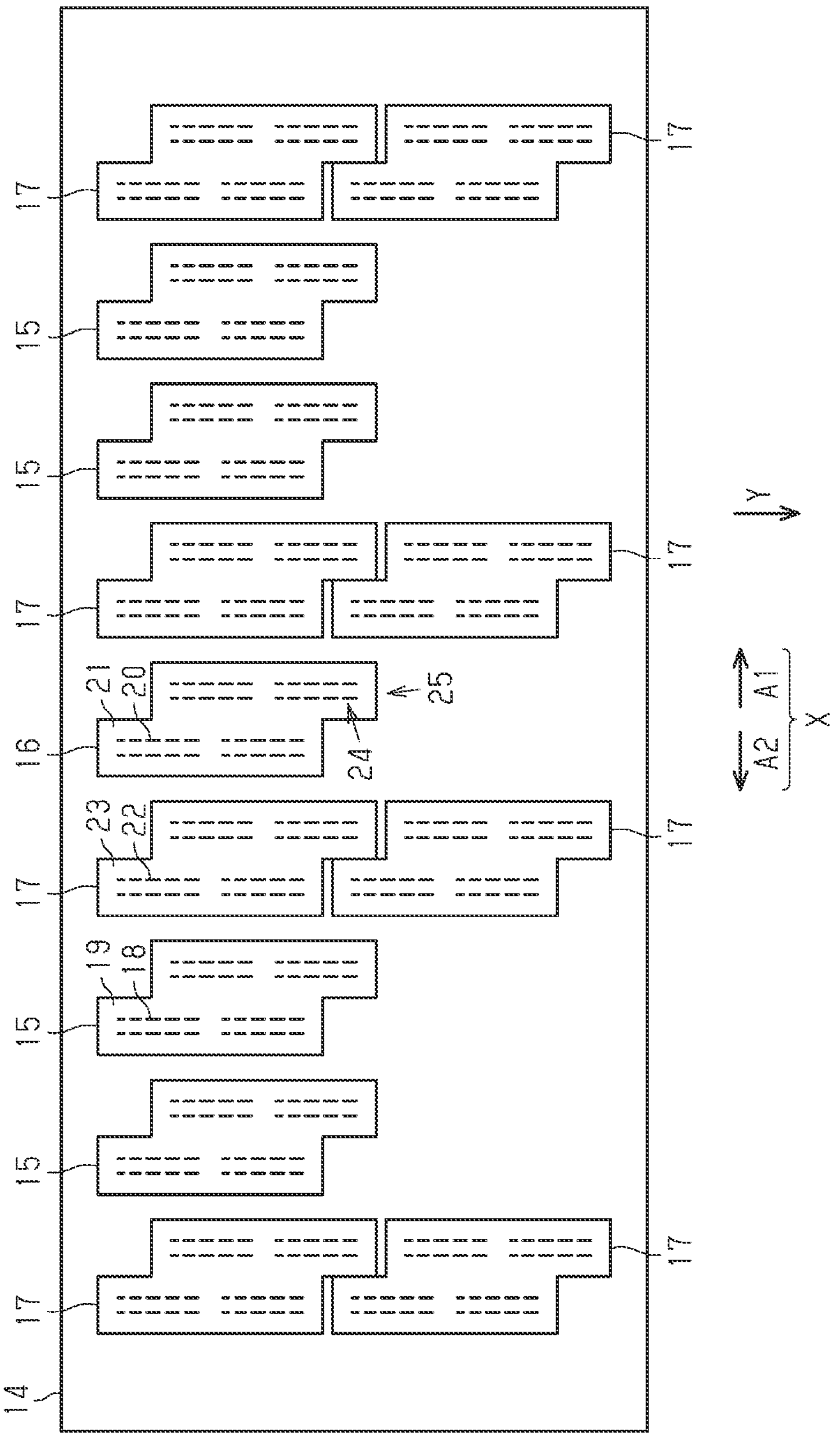
FIG. 2 is a bottom view of an ejecting unit.

As illustrated in FIG. 2, the ejecting unit 14 includes one or more heads. For example, the ejecting unit 14 includes one or more first heads 15 and one or more second heads 16. In one example, the ejecting unit 14 further includes one or more third heads 17. Specifically, the ejecting unit 14 includes four first heads 15, one second head 16, and eight third heads 17.

The plurality of heads may be arrayed in the scanning direction X. In one example, the plurality of heads are arrayed in nine rows in the scanning direction X. The four first heads 15 are arrayed in four rows in the scanning direction X. The second head 16 is arrayed in one row in the scanning direction X. The eight third heads 17 are arrayed in four rows in the scanning direction X. In other words, the eight third heads 17 are arrayed in pairs in the transport direction Y. The second head 16 of the heads in nine rows arrayed in the scanning direction X is located at the center. Of the four rows of the third heads 17, each of two rows of the third heads 17 is located at either end in the scanning direction X. Of the four rows of the third heads 17, the remaining two rows of the third heads 17 are located to sandwich the second head 16 therebetween in the scanning direction X. Instead of the plurality of third heads 17, the plurality of first heads 15 may be arrayed in the transport direction Y.

The head includes a nozzle surface in which one or more nozzles are open. The head ejects the liquid from the nozzle. In other words, the ejecting unit 14 includes a nozzle surface in which a nozzle is open. The first head 15 includes a first nozzle surface 19 in which one or more first nozzles 18 are open. The second head 16 includes a second nozzle surface 21 in which one or more second nozzles 20 are open. The third head 17 includes a third nozzle surface 23 in which one or more third nozzles 22 are open.

The first head 15 ejects the first liquid from the first nozzle 18. The second head 16 ejects the second liquid from the second nozzle 20. The third head 17 may eject the first liquid, the second liquid, or the third liquid from the third nozzle 22. In one example, the third head 17 ejects the third liquid from the third nozzle 22. The ejecting unit 14 is not limited to a configuration of ejecting different types of liquids from the respective heads, and may be configured to eject different types of liquids from one head, for example. For example, the first nozzle 18 and the second nozzle 20 may be open in one nozzle surface.

In the nozzle surface, the plurality of nozzles are arrayed in the transport direction Y. In this manner, one or more nozzle rows 24 are configured. In one example, in each of the first nozzle surface 19, the second nozzle surface 21< and the third nozzle surface 23, the plurality of nozzles are arrayed in the transport direction Y. In this manner, eight nozzle rows 24 are configured.

In the nozzle surface, the plurality of nozzle rows 24 are arrayed in the scanning direction X, one or more nozzle groups 25 are configured. In one example, for example, in each of the first nozzle surface 19, the second nozzle surface 21, and the third nozzle surface 23, the two nozzle rows 24 are arrayed in the scanning direction X. In this manner, the nozzle groups 25 are configured. In each of the first nozzle surface 19, the second nozzle surface 21, and the third nozzle surface 23, the four nozzle groups 25 are configured. In one nozzle surface, the four nozzle groups 25 are located to be shifted from each other in the scanning direction X and the transport direction Y.

As illustrated in FIG. 1, the liquid ejecting device 11 includes a carriage 26. The ejecting unit 14 is mounted to the carriage 26. The carriage 26 is configured to move in the scanning direction X. When the carriage 26 moves in the scanning direction X, the ejecting unit 14 moves in the scanning direction X.

The liquid ejecting device 11 may include a pressurizing unit 27. The pressurizing unit 27 is coupled to the ejecting unit 14. The pressurizing unit 27 is configured to pressurize the ejecting unit 14. For example, the pressurizing unit 27 is a pump. The pressurizing unit 27 pressurizes the ejecting unit 14 to forcefully discharge the liquid from the nozzle. With this, bubbles, a foreign material, and the like are discharged together with the liquid from the nozzle.

The pressurizing unit 27 is configured to be capable of selecting a nozzle from which the liquid is to be discharged, among the plurality of nozzles. For example, the pressurizing unit 27 is configured to be capable of selecting a head on which a pressure acts, for example. The pressurizing unit 27 pressurizes the first head 15 to discharge the liquid from the first nozzle 18. The pressurizing unit 27 pressurizes the second head 16 to discharge the liquid from the second nozzle 20. The pressurizing unit 27 pressurizes the third head 17 to discharge the liquid from the third nozzle 22. The liquid ejecting device 11 may include the pressurizing unit 27 for each head.

The pressurizing unit 27 pressurizes the ejecting unit 14 to discharge the liquid from one or a plurality of heads. In one example, the pressurizing unit 27 pressurizes the ejecting unit 14 to discharge the liquid from one or a plurality of rows of heads among the plurality of heads arrayed in the plurality of rows in the scanning direction X.

The liquid ejecting device 11 includes a maintenance mechanism 28. The maintenance mechanism 28 is configured to perform maintenance to the ejecting unit 14. For example, the maintenance mechanism 28 performs maintenance to the ejecting unit 14 by flushing, capping, cleaning, wiping, and the like.

Flushing is an operation of discharging the liquid from the nozzle as appropriate. Clogging at the nozzle can be suppressed by flushing. The maintenance mechanism 28 receives the liquid by flushing to perform maintenance to the ejecting unit 14.

Capping is an operation of covering the nozzle with the maintenance mechanism 28. The nozzle is moisturized by capping. With this, clogging at the nozzle is suppressed. The maintenance mechanism 28 performs capping to the ejecting unit 14 to perform maintenance to the ejecting unit 14.

Cleaning is an operation of forcefully discharging the liquid from the nozzle. Bubbles, a foreign material, and the like are discharged together with the liquid from the nozzle by cleaning. For example, cleaning includes pressure-cleaning and suction-cleaning. Pressure-cleaning is an operation of pressurizing the ejecting unit 14 to discharge the liquid from the nozzle. Suction-cleaning is an operation of sucking the ejecting unit 14 to discharge the liquid from the nozzle. The maintenance mechanism 28 receives the liquid by cleaning to perform maintenance to the ejecting unit 14.

Wiping is an operation of wiping the nozzle surface. The liquid, a foreign material, and the like that adhere to the nozzle surface are removed by wiping. The maintenance mechanism 28 wipes the ejecting unit 14 to perform maintenance to the ejecting unit 14.

The maintenance mechanism 28 includes one or more maintenance units. In one example, the maintenance mechanism 28 includes a first maintenance unit 29 and a second maintenance unit 30. The maintenance units are configured to perform maintenance to the ejecting unit 14. The maintenance units are arrayed in the supporting unit 13 in the scanning direction X. The first maintenance unit 29 is located in the first direction A1 with respect to the supporting unit 13. The second maintenance unit 30 is located in the second direction A2 with respect to the supporting unit 13.

The maintenance mechanism 28 discharges the liquid received by maintenance to a waste liquid storage unit. The waste liquid storage unit is configured to store a waste liquid. For example, the waste liquid storage unit is a tank that can be attached to the liquid ejecting device 11. The waste liquid storage unit may be a fixed tank installed in the liquid ejecting device 11. The waste liquid is a liquid that is discharged from the ejecting unit 14 at the time of maintenance.

One or more waste liquid storage units are mounted to the liquid ejecting device 11. In one example, one or more first waste liquid storage units 31 and one or more second waste liquid storage units 32 are mounted to the liquid ejecting device 11. In one example, two first waste liquid storage units 31 and two second waste liquid storage units 32 are mounted to the liquid ejecting device 11. The first waste liquid storage unit 31 stores the first liquid. The first waste liquid storage unit 31 may store the third liquid in addition to the first liquid. The first liquid and the third liquid do not react with each other, and hence can be stored collectively in the first waste liquid storage unit 31. The second waste liquid storage unit 32 stores the second liquid. One of the two first waste liquid storage units 31 is coupled to the first maintenance unit 29, and the other is coupled to the second maintenance unit 30. One of the two second waste liquid storage units 32 is coupled to the first maintenance unit 29, and the other one is coupled to the second maintenance unit 30.

The first maintenance unit 29 and the second maintenance unit 30 may discharge the first liquid to the first waste liquid storage unit 31 that is commonly shared. The first maintenance unit 29 and the second maintenance unit 30 may discharge the second liquid to the second waste liquid storage unit 32 that is commonly shared.

Maintenance Unit

Figure 3:
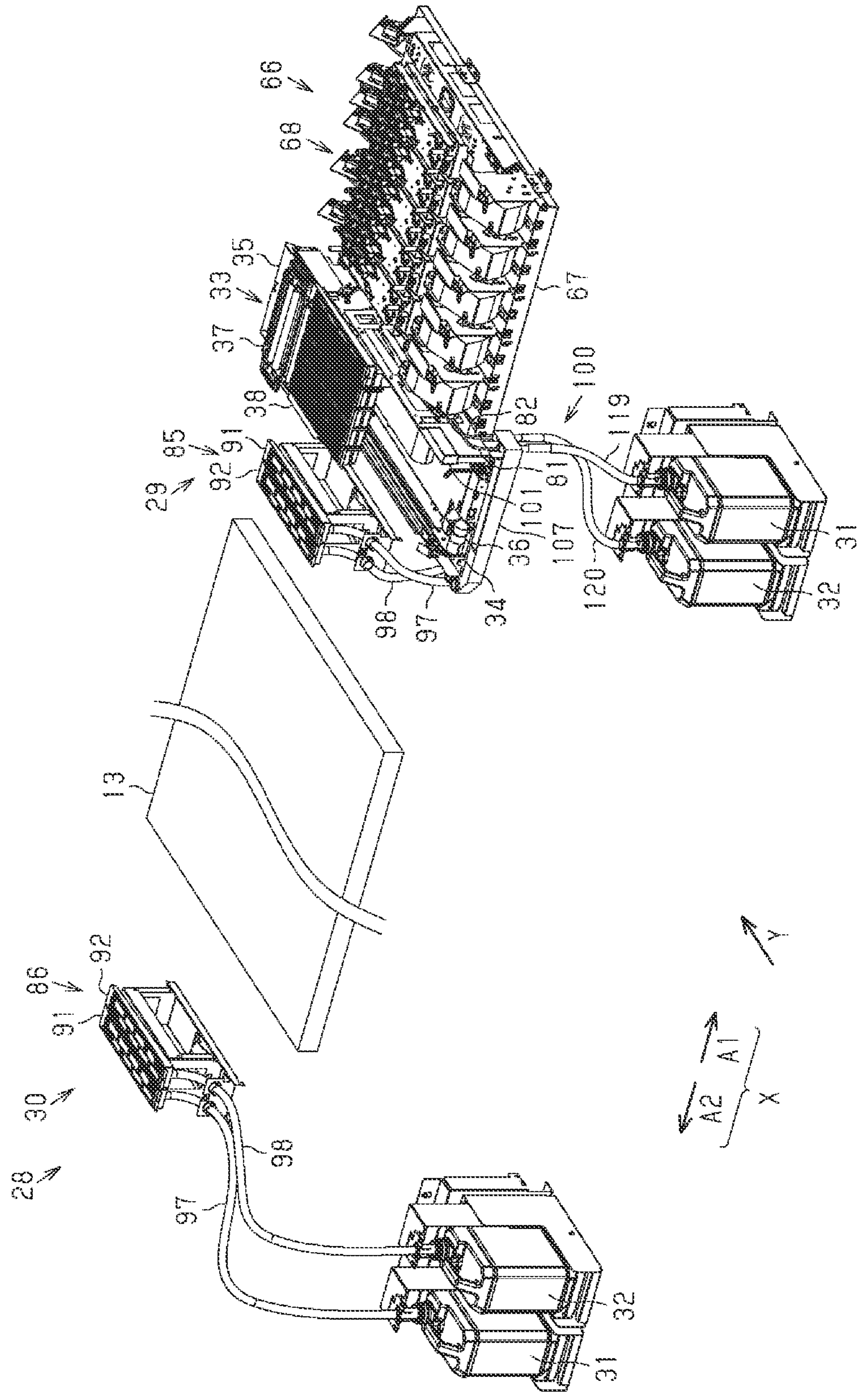
FIG. 3 is a perspective view of a maintenance mechanism.
Figure 4:
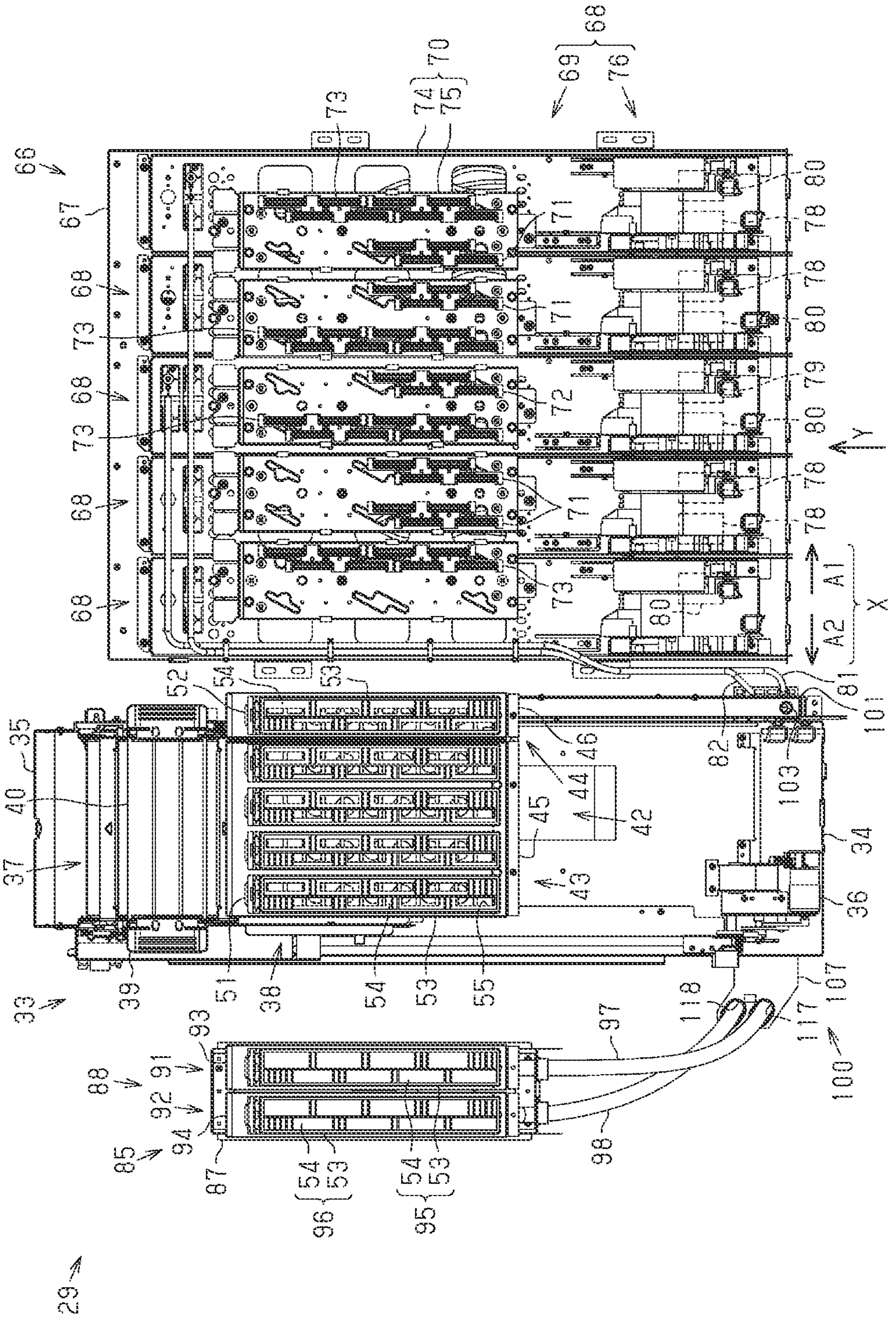
FIG. 4 is a top view of a first maintenance unit.

As illustrated in FIG. 3 and FIG. 4, the first maintenance unit 29 includes a maintenance unit 33. The maintenance unit 33 is a unit that performs maintenance to the ejecting unit 14 by at least one of flushing and cleaning, and wiping. In other words, the maintenance unit 33 may be a unit that performs maintenance to the ejecting unit 14 by flushing and wiping, or may be a unit that performs maintenance to the ejecting unit 14 by cleaning and wiping. In one example, the maintenance unit 33 performs maintenance to the ejecting unit 14 by flushing, cleaning, and wiping. Specifically, the maintenance unit 33 performs maintenance to the ejecting unit 14 by flushing, pressure-cleaning, and wiping. The maintenance unit 33 receives the liquid by flushing before printing. The maintenance unit 33 may receive the liquid by flushing during printing.

Figure 5:
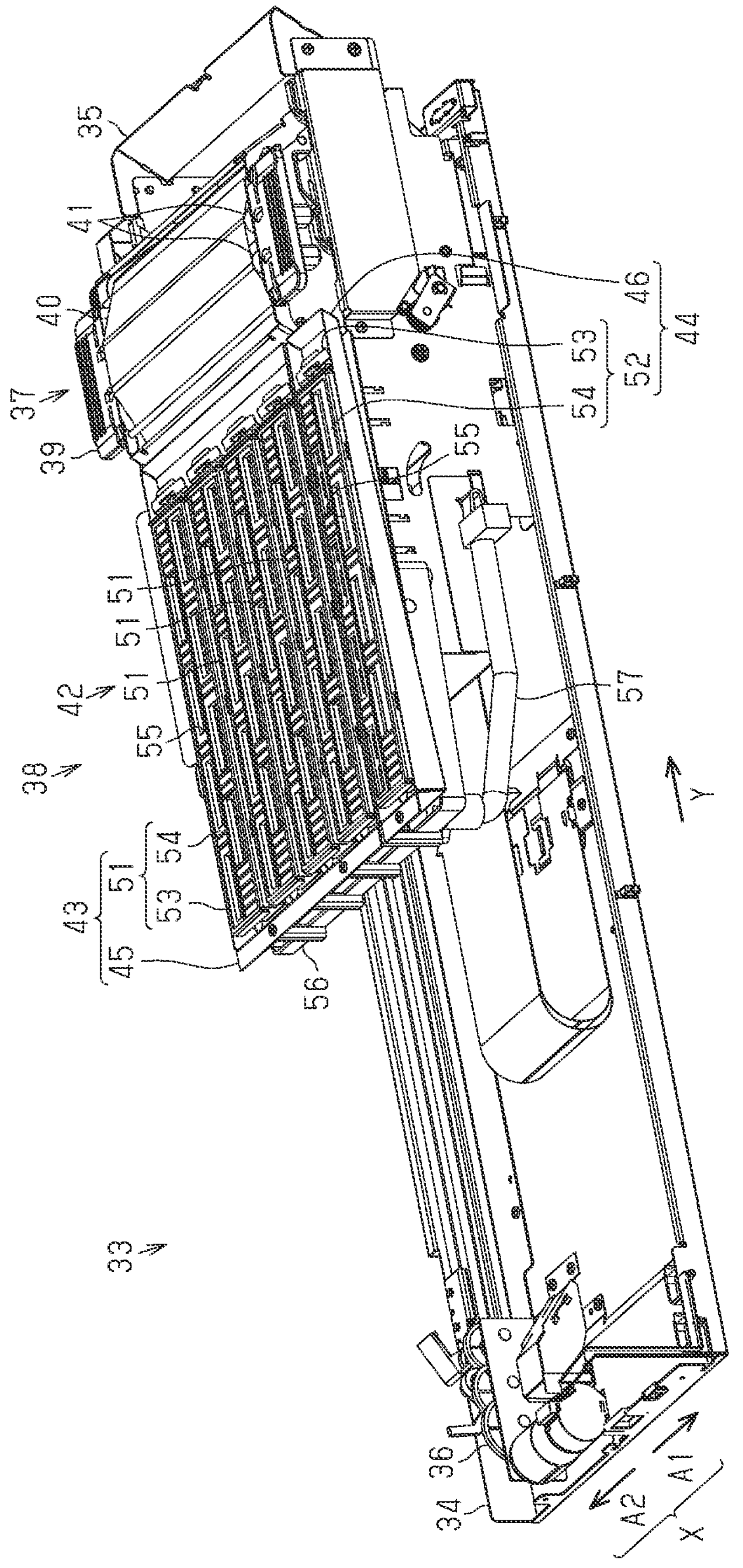
FIG. 5 is a perspective view of a maintenance unit.
Figure 6:
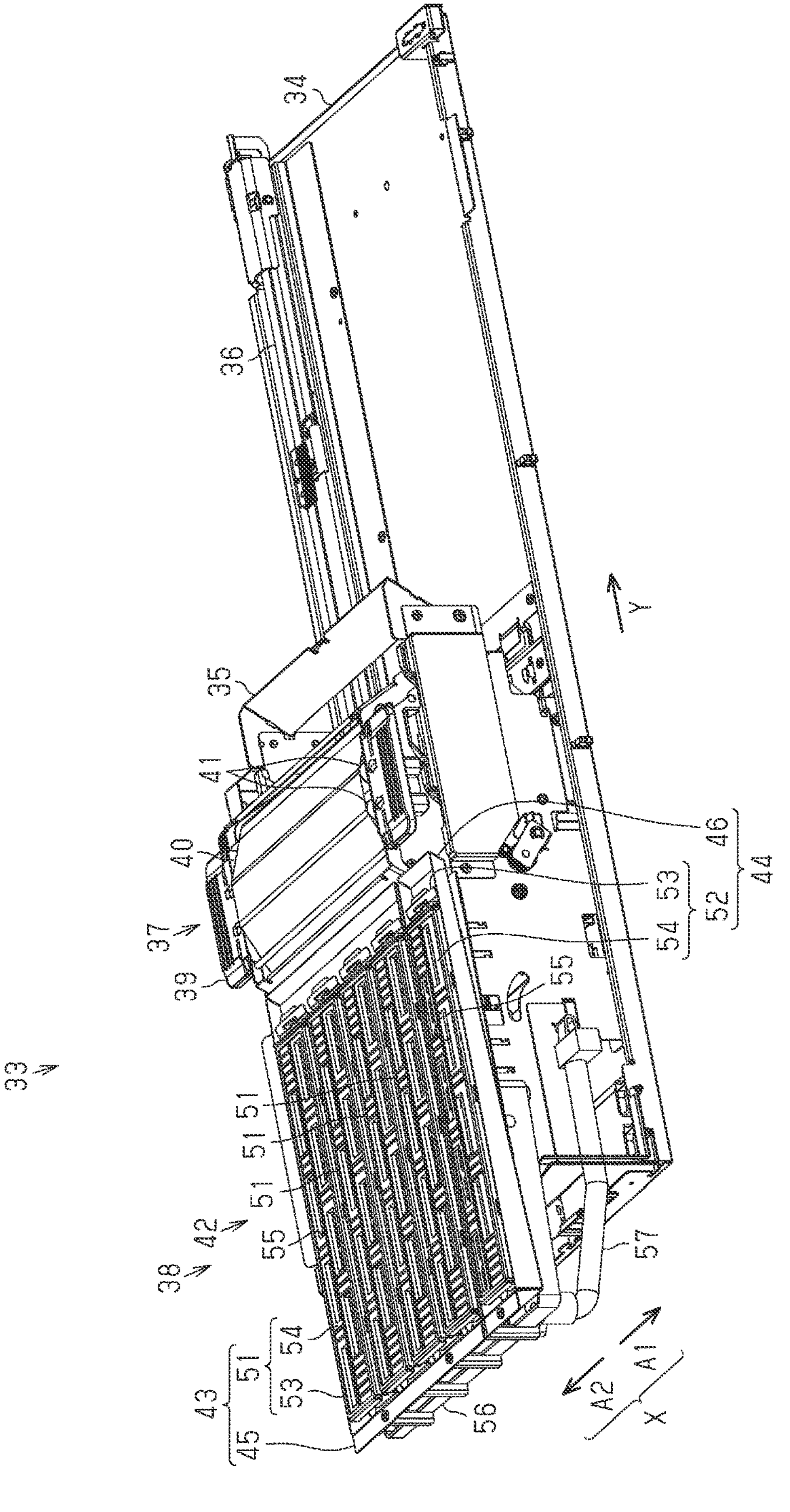
FIG. 6 is a perspective view in which a moving body moves from a state illustrated in FIG. 5.

As illustrated in FIG. 5 and FIG. 6, the maintenance unit 33 includes a base frame 34, a moving body 35, and a moving mechanism 36. The base frame 34 extends in one direction. Specifically, the base frame 34 extends in the transport direction Y. The base frame 34 supports the moving body 35 and the moving mechanism 36. The moving body 35 moves along the base frame 34. In other words, the moving body 35 moves in the one direction. Specifically, the moving body 35 moves in the transport direction Y and the direction opposite thereto. The moving mechanism 36 moves the moving body 35 with respect to the base frame 34. Examples of the moving mechanism 36 include a motor, a pulley, and a belt.

The maintenance unit 33 includes a wiping unit 37 and a receiving unit 38. The wiping unit 37 is configured to wipe the ejecting unit 14. The receiving unit 38 is configured to receive the liquid by at least one of flushing and cleaning. In other words, the receiving unit 38 is configured to receive the liquid discharged from the nozzle. In one example, the receiving unit 38 receives the liquid by flushing and pressure-cleaning.

The wiping unit 37 and the receiving unit 38 are mounted to the moving body 35. When the moving body 35 moves in the one direction, the wiping unit 37 and the receiving unit 38 move in the one direction. With this, the wiping unit 37 wipes the nozzle surface. In other words, the wiping unit 37 moves together with the receiving unit 38 in the one direction to wipe the nozzle surface. In one example, when the moving body 35 moves in the direction opposite to the transport direction Y, the wiping unit 37 wipes the ejecting unit 14.

The receiving unit 38 and the wiping unit 37 are arrayed in the transport direction Y in the stated order. With this, the receiving unit 38 receives the liquid from the nozzle, and then the wiping unit 37 moves in the direction opposite to the transport direction Y. In this manner, wiping of the ejecting unit 14 can be performed. Therefore, the maintenance unit 33 can efficiently perform maintenance to the ejecting unit 14. In particular, the liquid adheres to the nozzle surface after cleaning, thus execution of wiping is effective.

Figure 7:
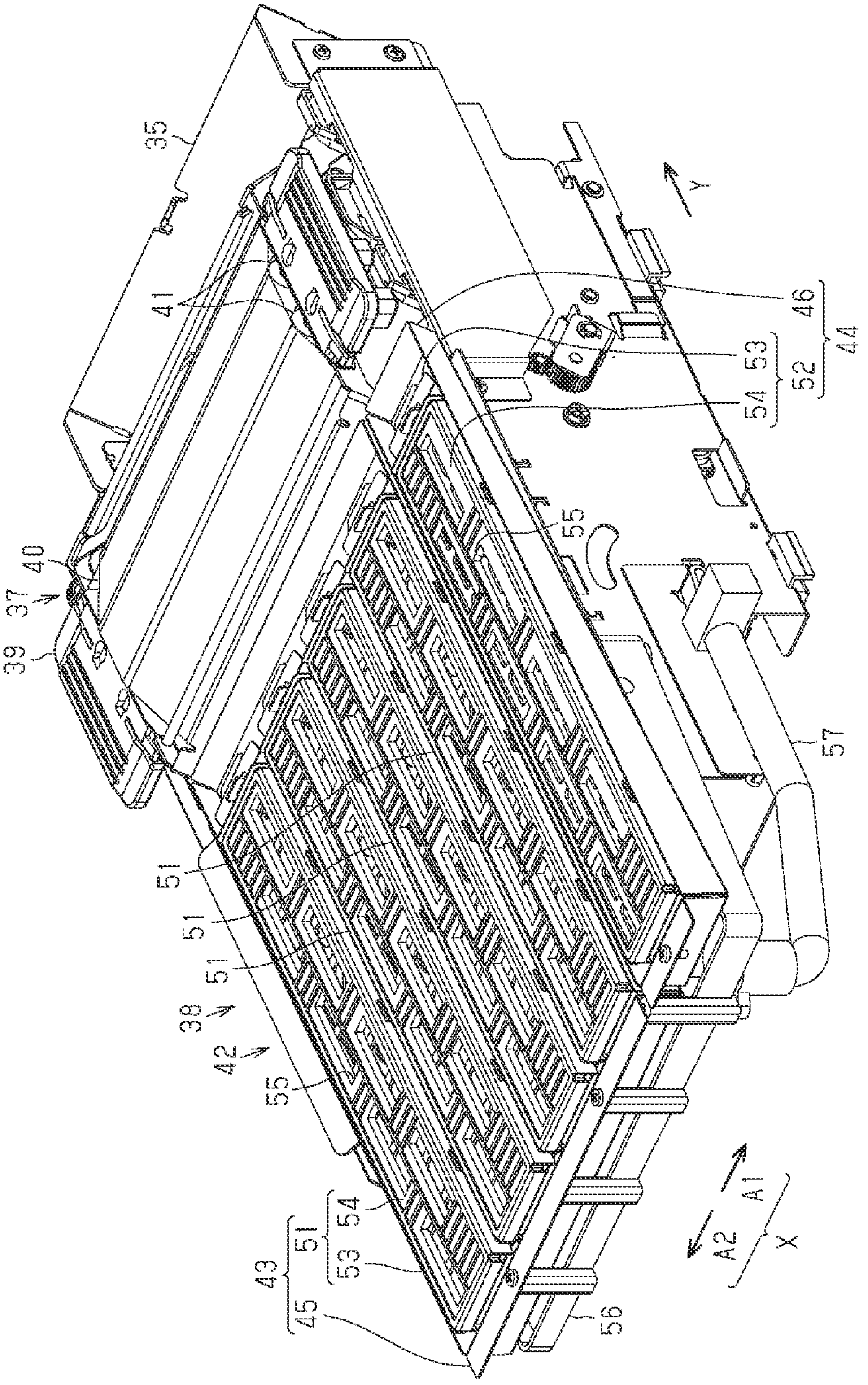
FIG. 7 is a perspective view of a receiving unit and a wiping unit.

As illustrated in FIG. 7, the wiping unit 37 includes a wiping case 39. The wiping case 39 is attached to the moving body 35.

The wiping unit 37 includes a wiping member 40. The wiping member 40 is accommodated in the wiping case 39. The wiping member 40 is a member that contacts with the nozzle surface. For example, the wiping member 40 is a cloth. The wiping member 40 contacts with the nozzle surface to absorb the liquid. With this, the liquid and a foreign material are removed from the nozzle surface. The wiping member 40 may contact with a plurality of heads or one head by single wiping. In one example, the wiping member 40 is capable of wiping four rows of heads by single wiping.

The wiping unit 37 includes a winding unit 41. The winding unit 41 is attached to the wiping case 39. The wiping member 40 is wound around the winding unit 41. A portion of the wiping member 40 around which the winding unit 41 is wound is exposed from the wiping case 39. For example, the winding unit 41 is a roller. The winding unit 41 presses the wiping member 40 against the nozzle surface. With this, the liquid and a foreign material are effectively removed from the nozzle surface.

The wiping unit 37 may be configured to feed out the wiping member 40 sequentially. For example, every time when the nozzle surface is wiped, the wiping unit 37 may feed out the wiping member 40. With this, the ejecting unit 14 is always wiped by the wiping member 40 that is newly fed out.

The receiving unit 38 includes a receiver 42. The receiver 42 is attached to the moving body 35. The receiver 42 receives the liquid discharged from the nozzle. The receiver 42 includes one or more receiving members. In one example, the receiver 42 includes a first receiving member 43 and a second receiving member 44. The first receiving member 43 receives the first liquid. The first receiving member 43 may receive the third liquid in addition to the first liquid. The first liquid and the third liquid do not react with each other, and hence can be stored collectively in the first receiving member 43. The second receiving member 44 receives the second liquid.

Figure 8:
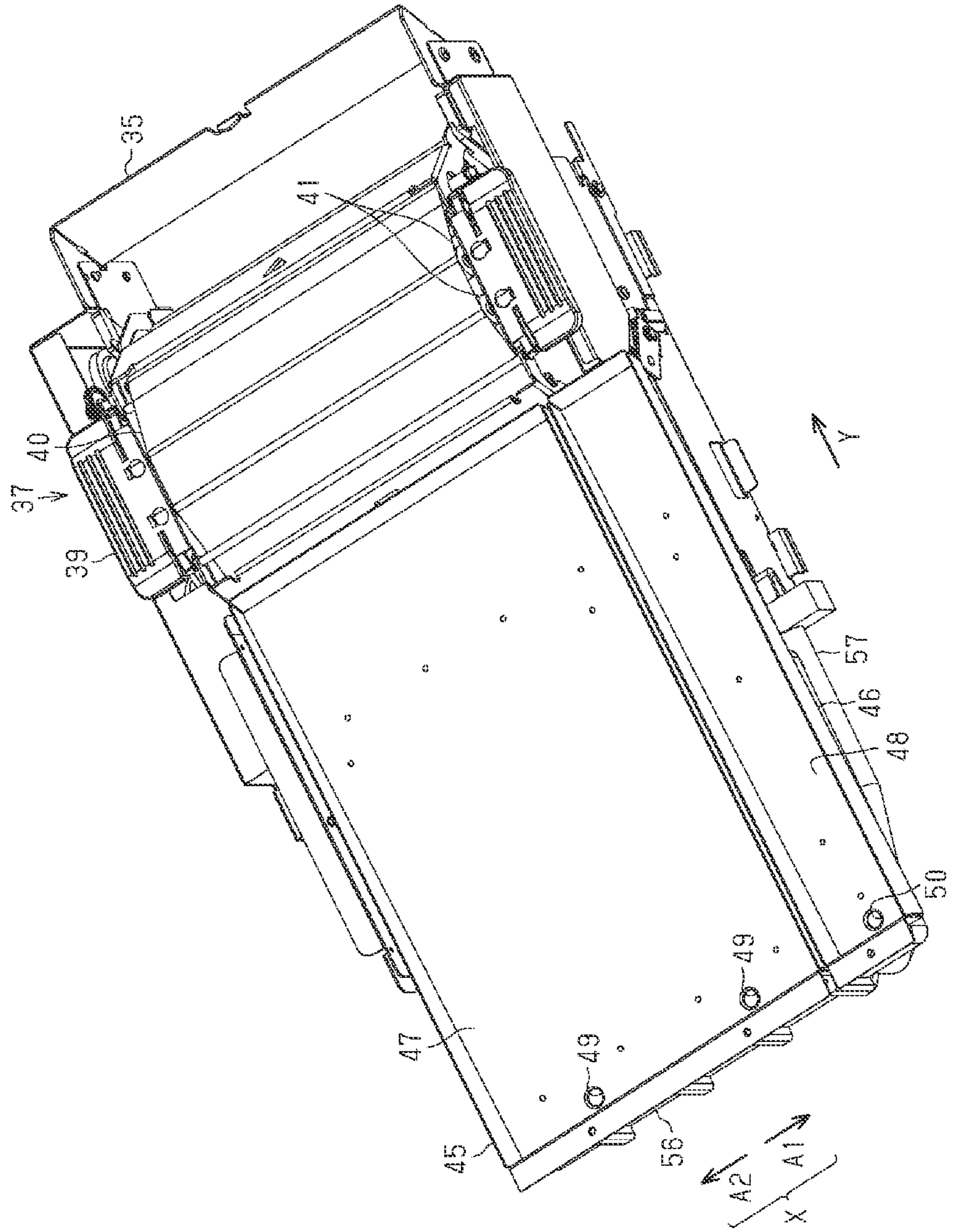
FIG. 8 is a perspective view of a first receiving tank and a second receiving tank.

As illustrated in FIG. 7 and FIG. 8, the receiving member includes one or more receiving tanks. In other words, the first receiving member 43 includes a first receiving tank 45. The second receiving member 44 includes a second receiving tank 46. The receiving tank is attached to the moving body 35. The receiving tank receives the liquid discharged from the nozzle.

The first receiving tank 45 is configured to be capable of receiving the liquid simultaneously from the plurality of rows of heads. In other words, the first receiving tank 45 is configured to face the plurality of rows of heads. In one example, the first receiving tank 45 is configured to face four rows of heads. With this, the first receiving tank 45 is capable of receiving the liquid simultaneously from four rows of heads. For example, the first receiving tank 45 is capable of receiving the liquid simultaneously from the first head 15 and the third head 17.

The second receiving tank 46 is configured to face one row of heads. Thus, the width of the second receiving tank 46 is smaller than the width of the first receiving tank 45. The width of the receiving tank is the length of the receiving tank in the scanning direction X.

The receiving tank includes a receiving surface. The first receiving tank 45 includes a first receiving surface 47. The second receiving tank 46 includes a second receiving surface 48. The receiving surface is a bottom surface of the receiving tank. The liquid received by the receiving tank accumulates on the receiving surface.

A lead-out hole is open in the receiving surface. In the first receiving surface 47, one or more first lead-out holes 49 are open. In one example, in the first receiving surface 47, two first lead-out holes 49 are open. In the second receiving surface 48, a second lead-out hole 50 is open. The first lead-out hole 49 is located at an upstream end of the first receiving surface 47 in the transport direction Y. The second lead-out hole 50 is located at an upstream end of the second receiving surface 48 in the transport direction Y. A lead-out hole is open in the receiving surface. The liquid is discharged from the receiving tank through the lead-out hole. The receiving surface may be inclined downward to the lead-out hole. With this, the liquid received by the receiving tank efficiently flows through the lead-out hole.

The receiving member may include an absorbing member. In one example, the first receiving member 43 includes one or more first absorbing members 51. Specifically, the first receiving member 43 includes four first absorbing members 51. The second receiving member 44 includes a second absorbing member 52. The absorbing member is a member that absorbs the liquid. The absorbing member is accommodated in the receiving tank. The absorbing member is located on the receiving surface. The first absorbing member 51 is located on the first receiving surface 47. The four first absorbing members 51 are arrayed in the scanning direction X. The second absorbing member 52 is located on the second receiving surface 48. The absorbing member receives the liquid from one row of heads. Therefore, the four first absorbing members 51 is capable of receiving the liquid simultaneously from four rows of heads.

The absorbing member includes an accommodating body 53 and an absorbing material 54. The accommodating body 53 stores the absorbing material 54. The accommodating body 53 is configured so that the liquid received from the ejecting unit 14 passes therethrough. The absorbing material 54 absorbs the liquid discharged from the nozzle. The liquid received by the absorbing material 54 is dropped onto the receiving tank. In the absorbing material 54, one or more through holes 55 may open. The through hole 55 is open correspondingly to the nozzle group 25.

While the liquid discharged by flushing is received by the absorbing material 54, the absorbing member may cause the liquid discharged by pressure-cleaning to pass through the through hole 55 so that the receiving tank receives the liquid. The amount of the liquid discharged by pressure-cleaning is more than the amount of the liquid discharged by flushing. Thus, when the absorbing material 54 receives the liquid discharged by pressure-cleaning, there may be a risk that the absorbing material 54 is clogged. Therefore, when the liquid by pressure-cleaning is discharged to the receiving unit 38, the ejecting unit 14 may be located at a position at which the nozzle overlaps with the through hole 55 in the vertical direction. When the liquid by flushing is discharged to the receiving unit 38, the ejecting unit 14 may be located at a position at which the nozzle does not overlap with the through hole 55 in the vertical direction.

Figure 9:
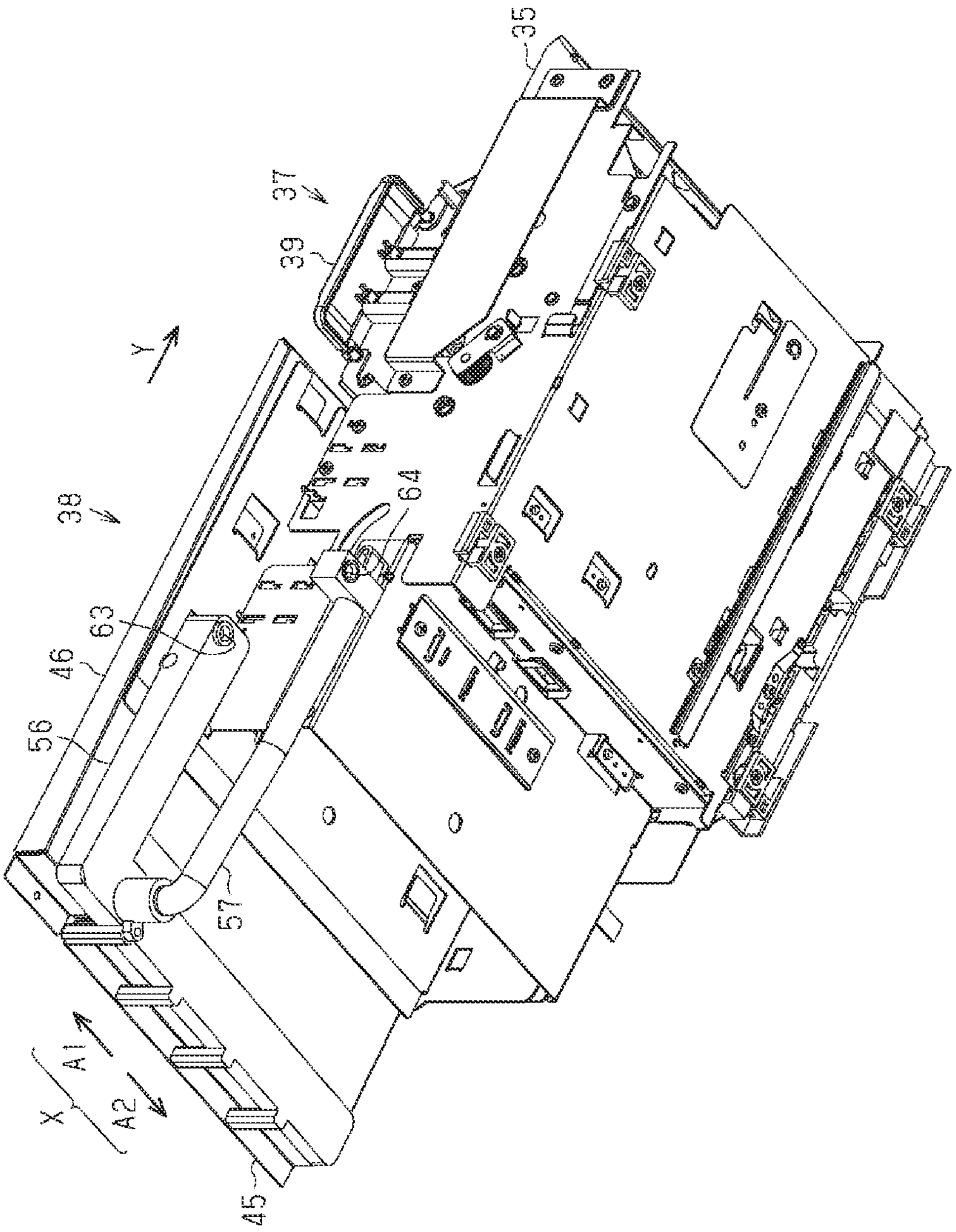
FIG. 9 is a perspective view as viewed from an angle different from FIG. 8.
Figure 10:
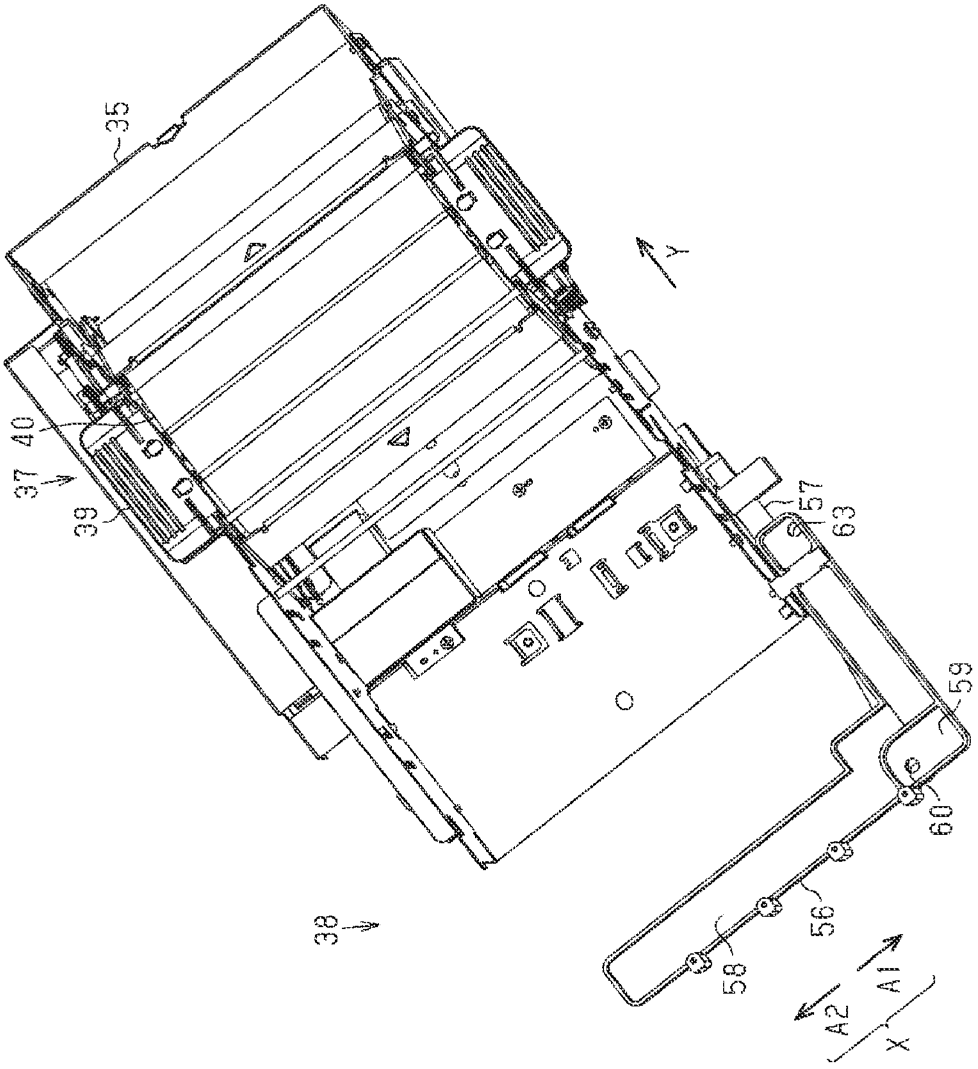
FIG. 10 is a perspective view illustrating a first receiving gutter and a second receiving gutter.

As illustrated in FIG. 9 and FIG. 10, the receiving unit 38 includes one or more receiving gutters. In one example, the receiving unit 38 includes a first receiving gutter 56 and a second receiving gutter 57. The receiving gutter is attached to the moving body 35. The receiving gutter is a member that directs the liquid from the receiving tank to a collecting unit 100, which is described later. The receiving gutter receives the liquid from the receiving tank. The first receiving gutter 56 receives the liquid from the first receiving tank 45. For example, the first receiving gutter 56 is a tray. For example, the first receiving gutter 56 extends in an L-like shape. The second receiving gutter 57 receives the liquid from the second receiving tank 46. For example, the second receiving gutter 57 is a pipe.

The first receiving gutter 56 overlaps with the receiver 42 as viewed in a vertical direction. In one example, the first receiving gutter 56 overlaps with the first receiving tank 45 and the second receiving tank 46 as viewed in the vertical direction. The first receiving gutter 56 may be located that a part thereof does not overlap with the receiver 42 in the vertical direction. The first receiving gutter 56 includes one or more receiving regions. In one example, the first receiving gutter 56 includes a first receiving region 58 and a second receiving region 59.

The first receiving region 58 is a region that receives the liquid from the first receiving tank 45. The first receiving region 58 overlaps with the first lead-out hole 49 as viewed in the vertical direction. Thus, the first receiving gutter 56 receives the liquid dropped through the first lead-out hole 49, in the first receiving region 58. The liquid dropped through the first lead-out hole 49 flows in the first receiving region 58. In one example, the first receiving region 58 is region having an L-like shape.

The second receiving region 59 is a region that receives the liquid from the second receiving tank 46. The second receiving region 59 is sectioned from the first receiving region 58 in the first receiving gutter 56. The second receiving region 59 overlaps with the second lead-out hole 50 as viewed in the vertical direction. Thus, the first receiving gutter 56 receives the liquid dropped through the second lead-out hole 50, in the second receiving region 59. In the second receiving region 59, a guiding hole 60 is open. The liquid is dropped from the second receiving region 59 through the guiding hole 60. In one example, the second receiving region 59 is a region having a rectangular shape.

The second receiving gutter 57 overlaps with the receiver 42 as viewed in the vertical direction. In one example, the second receiving gutter 57 overlaps with the first receiving tank 45 and the second receiving tank 46 as viewed in the vertical direction. The second receiving gutter 57 may be located that a part thereof does not overlap with the receiver 42 in the vertical direction.

The second receiving gutter 57 overlaps with the first receiving gutter 56 as viewed in the vertical direction. Specifically, the second receiving gutter 57 overlaps with the guiding hole 60 as viewed in the vertical direction. Specifically, the base end portion of the second receiving gutter 57 overlaps with the guiding hole 60 as viewed in the vertical direction. With this, the second receiving gutter 57 receives the liquid from the second receiving region 59. Therefore, the second receiving gutter 57 receives the liquid from the second receiving tank 46. The second receiving gutter 57 may receive the liquid directly from the second receiving tank 46. For example, the second receiving gutter 57 may receive the liquid dropped through the second lead-out hole 50. In this case, the second receiving gutter 57 may not overlap with the first receiving gutter 56 as viewed in the vertical direction.

A discharging hole is open in the receiving gutter. A first discharging hole 63 is open in the first receiving gutter 56. A second discharging hole 64 is open in the second receiving gutter 57. The discharging hole is a hole through which the liquid received by the receiving gutter is dropped onto the collecting unit 100. In other words, the discharging hole is a hole through which the liquid received by the receiving tank is dropped onto the collecting unit 100. The liquid received by the first receiving tank 45 is dropped onto the collecting unit 100 through the first discharging hole 63. The liquid received by the second receiving tank 46 is dropped onto the collecting unit 100 through the second discharging hole 64. The liquid is discharged from the receiving gutter to the collecting unit 100 through the discharging hole.

The liquid flowing in the receiving gutter is dropped onto the collecting unit 100 through the discharging hole. The first discharging hole 63 is open in the first receiving region 58. Thus, the first receiving region 58 may be inclined downward to the first discharging hole 63. The second discharging hole 64 is open in the distal end portion of the second receiving gutter 57. Thus, the second receiving gutter 57 may be inclined downward from the base end portion to the distal end portion.

The first discharging hole 63 and the second discharging hole 64 are located to be arrayed in the vertical direction when the maintenance unit 33 is viewed from the front. In other words, the position of the first discharging hole 63 in the scanning direction X matches with the position of the second discharging hole 64 in the scanning direction X. With this, a foot space of the first receiving gutter 56 and the second receiving gutter 57 is reduced. The first discharging hole 63 is located above the second discharging hole 64. The first discharging hole 63 is located upstream of the second discharging hole 64 in the transport direction Y.

The position of the first discharging hole 63 in the scanning direction X may be shifted from the position of the second discharging hole 64 in the scanning direction X. The position of the first discharging hole 63 in the vertical direction may match with the position of the second discharging hole 64 in the vertical direction. For example, the first discharging hole 63 and the second discharging hole 64 may be arrayed in the scanning direction X. The first discharging hole 63 may be located below the second discharging hole 64. The first discharging hole 63 may be located downstream of the second discharging hole 64 in the transport direction Y. The first discharging hole 63 mayor may not overlap with the receiver 42 as viewed in the vertical direction. The second discharging hole 64 mayor may not overlap with the receiver 42 as viewed in the vertical direction.

Cap Unit

As illustrated in FIG. 3 and FIG. 4, the first maintenance unit 29 includes a cap unit 66. The cap unit 66 is a unit that performs maintenance to the ejecting unit 14 by at least one of cleaning and capping. In other words, the cap unit 66 may be a unit that performs maintenance to the ejecting unit 14 by cleaning, or may be a unit that performs maintenance to the ejecting unit 14 by capping. In one example, the cap unit 66 performs maintenance to the ejecting unit 14 by suction-cleaning and capping.

Figure 11:
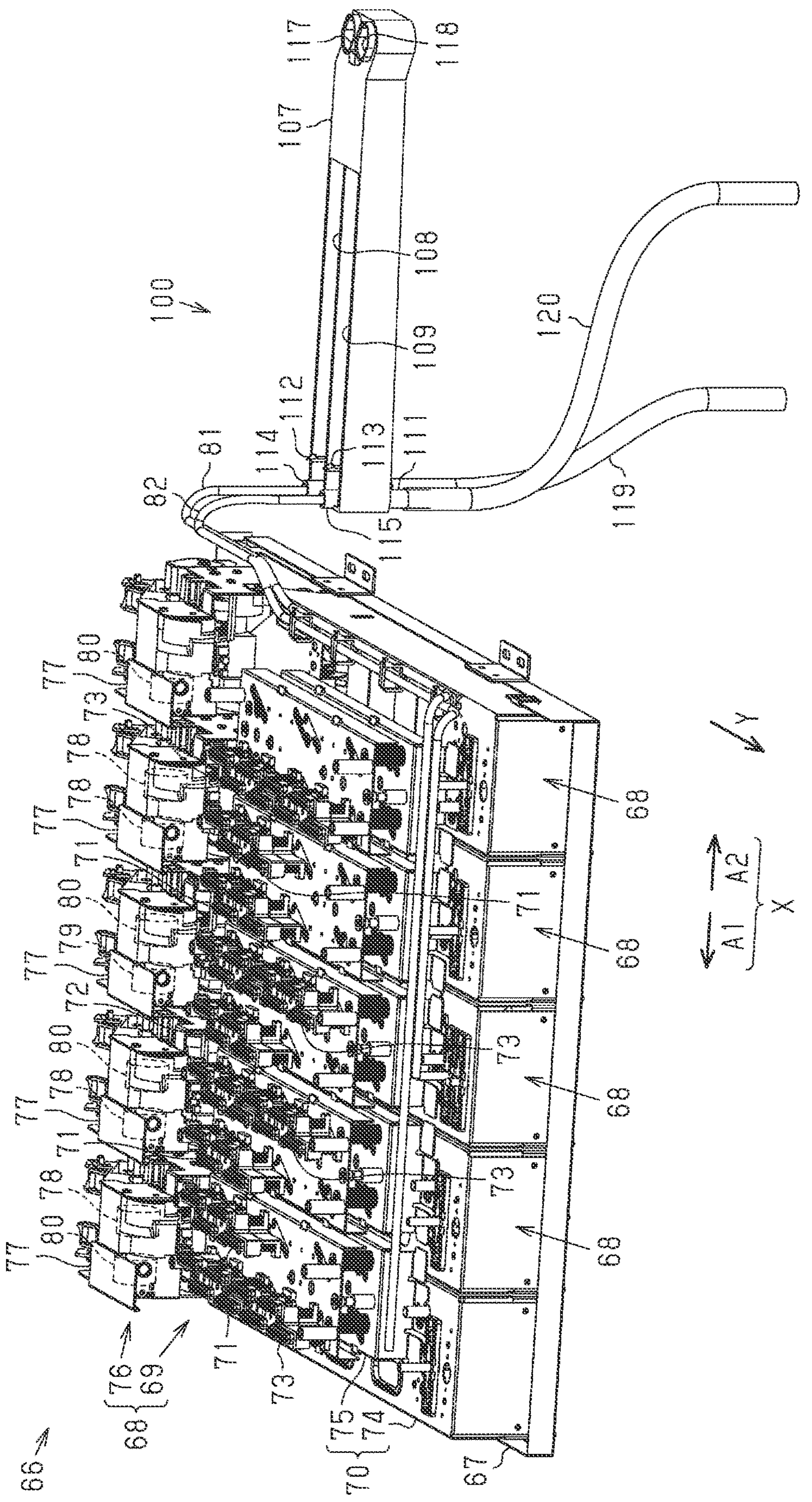
FIG. 11 is a perspective view illustrating a cap unit.

As illustrated in FIG. 11, the cap unit 66 includes a cap base 67 and one or more cap units 68. In one example, the cap unit 66 includes five cap units 68. The cap base 67 supports the cap unit 68. The cap unit 68 is attached to the cap base 67. The five cap units 68 are arrayed in the scanning direction X. The cap unit 68 is configured to cap the ejecting unit 14. The cap unit 68 is configured to suck the ejecting unit 14.

The cap unit 68 is configured to cap one or a plurality of rows of heads. In one example, the cap unit 68 is configured to cap one or two rows of heads. Specifically, four cap units 68 of the five cap units 68 are each configured to cap the two rows of heads adjacent to each other in the scanning direction X. One cap unit 68 of the five cap units 68 is configured to cap one row of heads. The five cap units 68 includes the cap unit 68 that caps the first head 15, the cap unit 68 that caps the first head 15 and the third head 17, the cap unit 68 that caps the second head 16 and the third head 17, and the cap unit 68 that caps the third head 17. The configuration is not limited thereto. The cap unit 68 may be configured to cap the first head 15 and the second head 16, or may be configured to cap the first head 15, the second head 16, and the third head 17. Among the five cap units 68, the cap unit 68 that caps the second head 16 and the third head 17 is located at the center in the scanning direction X.

The cap unit 68 includes a cap body 69. The cap body 69 is located on the cap base 67. The cap body 69 includes a support table 70 and one or more caps. Therefore, the cap unit 66 includes one or more caps. In one example, the cap unit 66 includes the first cap 71, a second cap 72, and a third cap 73. In other words, one or more caps of each of the plurality of cap units 68 include the first cap 71, the second cap 72, and the third cap 73.

The support table 70 supports one or more caps. In one example, the support table 70 includes a base portion 74 and a support portion 75. The base portion 74 is a portion that is attached to the cap base 67. The support portion 75 is a portion to which one or more caps are attached. The support portion 75 is located on the base portion 74.

The cap is located on the support portion 75. The cap contacts with the ejecting unit 14 to cap the ejecting unit 14. Specifically, the cap contacts with the nozzle surface to cap the head. The first cap 71 contacts with the first nozzle surface 19 to cap the first head 15. The second cap 72 contacts with the second nozzle surface 21 to cap the second head 16. The third cap 73 contacts with the third nozzle surface 23 to cap the third head 17.

The cap covers one or a plurality of nozzle rows 24 by capping. In one example, the cap covers one nozzle group 25 by capping. In other words, one head is capped with four caps. One head may be capped with one cap.

In the five cap units 68, the plurality of caps are located correspondingly to arrangement of the plurality of heads. The five cap units 68 includes the cap unit 68 including the plurality of first caps 71, the cap unit 68 including the plurality of first caps 71 and the plurality of third caps 73, the cap unit 68 including the plurality of second caps 72 and the plurality of third caps 73, and the cap unit 68 including the plurality of third caps 73. The configuration is not limited thereto. One or more cap units 68 may include the cap unit 68 including the first cap 71 and the second cap 72 or may include the cap unit 68 including the first cap 71, the second cap 72, and the third cap 73.

The cap unit 68 may include a pump body 76. The pump body 76 is coupled to the cap body 69. The pump body 76 includes a pump case 77 and one or more pumps. Therefore, the cap unit 66 includes one or more pumps. In one example, the cap unit 66 includes a first pump 78, a second pump 79, and a third pump 80. In other words, one or more pumps of each of the plurality of cap units 68 includes the first pump 78, the second pump 79, and the third pump 80.

In one example, the pump body 76 includes the pump case 77 and one or two pumps. The pump case 77 is a case that accommodates a pump. Specifically, the pump case 77 accommodates one or two pumps. The pump is coupled to the cap. The pump sucks the inside of the cap. In a state in which the cap contacts with the ejecting unit 14, when the pump sucks the inside of the cap, the liquid is sucked out of the nozzle. In other words, in a state in which the ejecting unit 14 is capped with the cap, when the pump sucks the inside of the cap, suction-cleaning is performed. Therefore, the cap receives the liquid by suction-cleaning. The liquid received by the cap is discharged by the pump to the collecting unit 100.

The first pump 78 is coupled to the first cap 71. The first pump 78 sucks the inside of the first cap 71. When the first pump 78 sucks the inside of the first cap 71, the first liquid is sucked out of the first nozzle 18. The second pump 79 is coupled to the second cap 72. The second pump 79 sucks the inside of the second cap 72. When the second pump 79 sucks the inside of the second cap 72, the second liquid is sucked out of the second nozzle 20. The third pump 80 is coupled to the third cap 73. The third pump 80 sucks the inside of the third cap 73. When the third pump 80 sucks the inside of the third cap 73, the third liquid is sucked out.

The pump is coupled to one or a plurality of caps that contact with one row of heads of the heads arrayed in the plurality of rows in the scanning direction X. Thus, the cap unit 66 includes nine pumps. The nine pumps include four first pumps 78, one second pump 79, and four third pumps 80. The five cap units 68 includes the cap unit 68 including one pump and the cap units 68 including two pumps. Specifically, the five cap units 68 includes the cap unit 68 including the two first pumps 78, the cap unit 68 including the first pump 78 and the third pump 80, the cap unit 68 including the second pump 79 and the third pump 80, and the cap unit 68 including the one third pump 80. The configuration is not limited thereto. One or more cap units 68 may include the cap unit 68 including the first pump 78 and the second pump 79, or may include the cap unit 68 including the first pump 78, the second pump 79, and the third pump 80.

The pump is not limited to being coupled to one or a plurality of caps that contact with one row of heads of the heads arrayed in the plurality of rows in the scanning direction X. For example, one first pump 78 may be coupled to all the first caps 71. One third pump 80 may be coupled to all the third caps 73.

The cap unit 66 includes one or more cap discharging members. In one example, the cap unit 66 includes a first cap discharging member 81 and a second cap discharging member 82. The cap discharging member discharges the liquid from the cap to the collecting unit 100. For example, the cap discharging member is a tube. The cap discharging member is coupled to the cap and the collecting unit 100. The first cap discharging member 81 is coupled to the first cap 71. In one example, the first cap discharging member 81 is coupled to the first cap 71 and the third cap 73. Thus, in the first cap discharging member 81, the first liquid and the third liquid flow. The second cap discharging member 82 is coupled to the second cap 72. Thus, in the second cap discharging member 82, the second liquid flows.

Flushing Unit

As illustrated in FIG. 3, each of the first maintenance unit 29 and the second maintenance unit 30 may include a flushing unit. The first maintenance unit 29 includes a first flushing unit 85. The second maintenance unit 30 includes the second flushing unit 86. The flushing unit is configured to receive the liquid by flushing. Specifically, the flushing unit is configured to receive the liquid by flushing during printing. The flushing unit may receive the liquid by flushing before printing. The first flushing unit 85 is located between the supporting unit 13 and the maintenance unit 33 in the scanning direction X. The first flushing unit 85 and the second flushing unit 86 are configured similarly. Here, description is made on the first flushing unit 85.

Figure 12:
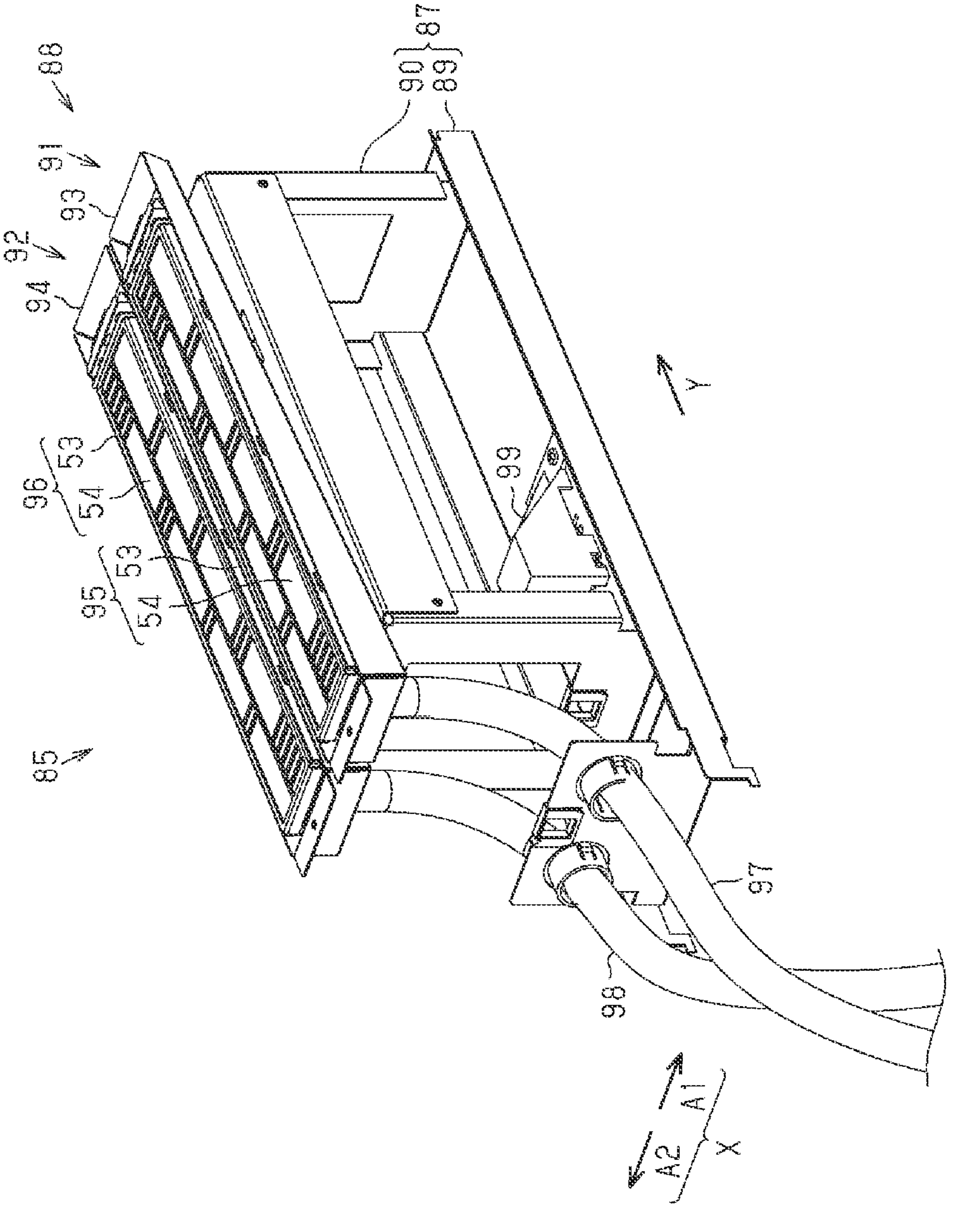
FIG. 12 is a perspective view illustrating a flushing unit.

As illustrated in FIG. 12, the first flushing unit 85 includes a flushing frame 87 and a flushing receiving unit 88.

The flushing frame 87 supports the flushing receiving unit 88. The flushing frame 87 includes a base member 89 and a supporting member 90. The base member 89 is fixed to the liquid ejecting device 11. The supporting member 90 is attached to the base member 89. The supporting member 90 extends upward from the base member 89. The supporting member 90 supports the flushing receiving unit 88.

The flushing receiving unit 88 includes one or more flushing receiving members. In one example, the flushing receiving unit 88 includes a first flushing receiving member 91 and a second flushing receiving member 92. The first flushing receiving member 91 receives the first liquid. The first flushing receiving member 91 may receive the third liquid in addition to the first liquid. The first liquid and the third liquid do not react with each other, and hence can be received collectively by the first flushing receiving member 91. The second flushing receiving member 92 receives the second liquid. The first flushing receiving member 91 and the second flushing receiving member 92 are arrayed in the scanning direction X. The flushing receiving member is configured similarly to the receiving member of the receiving unit 38.

The flushing receiving member includes a flushing receiving tank. The first flushing receiving member 91 includes a first flushing receiving tank 93. The first flushing receiving tank 93 receives the liquid from the first head 15 and the third head 17 by flushing. The second flushing receiving member 92 includes a second flushing receiving tank 94. The second flushing receiving tank 94 receives the liquid from the second head 16 by flushing. The flushing receiving tank is similar to the receiving tank of the receiving unit 38.

The flushing receiving member may include a flushing absorbing member. The first flushing receiving member 91 may include a first flushing absorbing member 95. The second flushing receiving member 92 may include a second flushing absorbing member 96. The flushing absorbing member is similar to the absorbing member of the receiving unit 38. Therefore, the flushing absorbing member includes the accommodating body 53 and the absorbing material 54. The flushing receiving member does not receive the liquid by cleaning. Thus, the through hole 55 may not be open in the absorbing material 54.

The first flushing unit 85 includes one or more flushing discharging members. The first flushing unit 85 includes a first flushing discharging member 97 and a second flushing discharging member 98. The flushing discharging member discharges the liquid from the flushing receiving member to the collecting unit 100. The flushing discharging member is coupled to the flushing receiving tank and the collecting unit 100. For example, the flushing discharging member is a tube. The first flushing discharging member 97 is coupled to the first flushing receiving tank 93. Thus, the first liquid and the third liquid flow in the first flushing discharging member 97. The second flushing discharging member 98 is coupled to the second flushing receiving tank 94. Thus, the second liquid flows in the second flushing discharging member 98.

In the second flushing unit 86, the flushing discharging member is coupled to the flushing receiving tank and the waste liquid storage unit, which is different from the first flushing unit 85. The flushing discharging member of the second flushing unit 86 may be coupled to the collecting unit 100. In this case, the liquid that is received each of the first flushing unit 85 and the second flushing unit 86 can be stored in the waste liquid storage unit that is commonly shared.

The first flushing unit 85 may include a liquid sensor 99. The liquid sensor 99 is attached to the flushing frame 87. Specifically, the liquid sensor 99 is attached to the base member 89. In the first flushing unit 85, the liquid may drip from the flushing receiving tank. The liquid dripping from the flushing receiving tank accumulates on the base member 89. Thus, the liquid sensor 99 detects the liquid dripping from the flushing receiving tank onto the base member 89. In other words, leakage of the liquid from the flushing receiving member can be detected by the liquid sensor 99.

Collecting Unit

As illustrated in FIG. 3, the liquid ejecting device 11 includes the collecting unit 100. The collecting unit 100 is configured to collect the liquid from the maintenance unit. Specifically, the collecting unit 100 is configured to collect the liquid from the first maintenance unit 29. The collecting unit 100 may be configured to collect the liquid from both the first maintenance unit 29 and the second maintenance unit 30.

The collecting unit 100 directs the liquid being collected to the waste liquid storage unit. The collecting unit 100 collects the first liquid and the second liquid separately. The collecting unit 100 directs the first liquid being collected to the first waste liquid storage unit 31. The collecting unit 100 directs the second liquid being collected to the second waste liquid storage unit 32. The collecting unit 100 directs the third liquid being collected to the first waste liquid storage unit 31.

The collecting unit 100 is configured to collect the liquid received by the receiving unit 38. The collecting unit 100 directs the liquid received by the receiving unit 38 to the waste liquid storage unit. The collecting unit 100 directs the liquid received by the first receiving tank 45 to the first waste liquid storage unit 31, and directs the liquid received by the second receiving tank 46 to the second waste liquid storage unit 32.

The collecting unit 100 is configured to collect the liquid received by the cap unit 66. The collecting unit 100 directs the liquid received by the cap unit 66 to the waste liquid storage unit. The collecting unit 100 directs the liquid received by each of the first cap 71 and the third cap 73 to the first waste liquid storage unit 31, and directs the liquid received by the second cap 72 to the second waste liquid storage unit 32.

The collecting unit 100 is configured to collect the liquid received by the first flushing unit 85. The collecting unit 100 directs the liquid received by the first flushing unit 85 to the waste liquid storage unit. Specifically, the collecting unit 100 directs the liquid received by the first flushing receiving tank 93 to the first waste liquid storage unit 31, and directs the liquid received by the second flushing receiving tank 94 to the second waste liquid storage unit 32.

Figure 13:
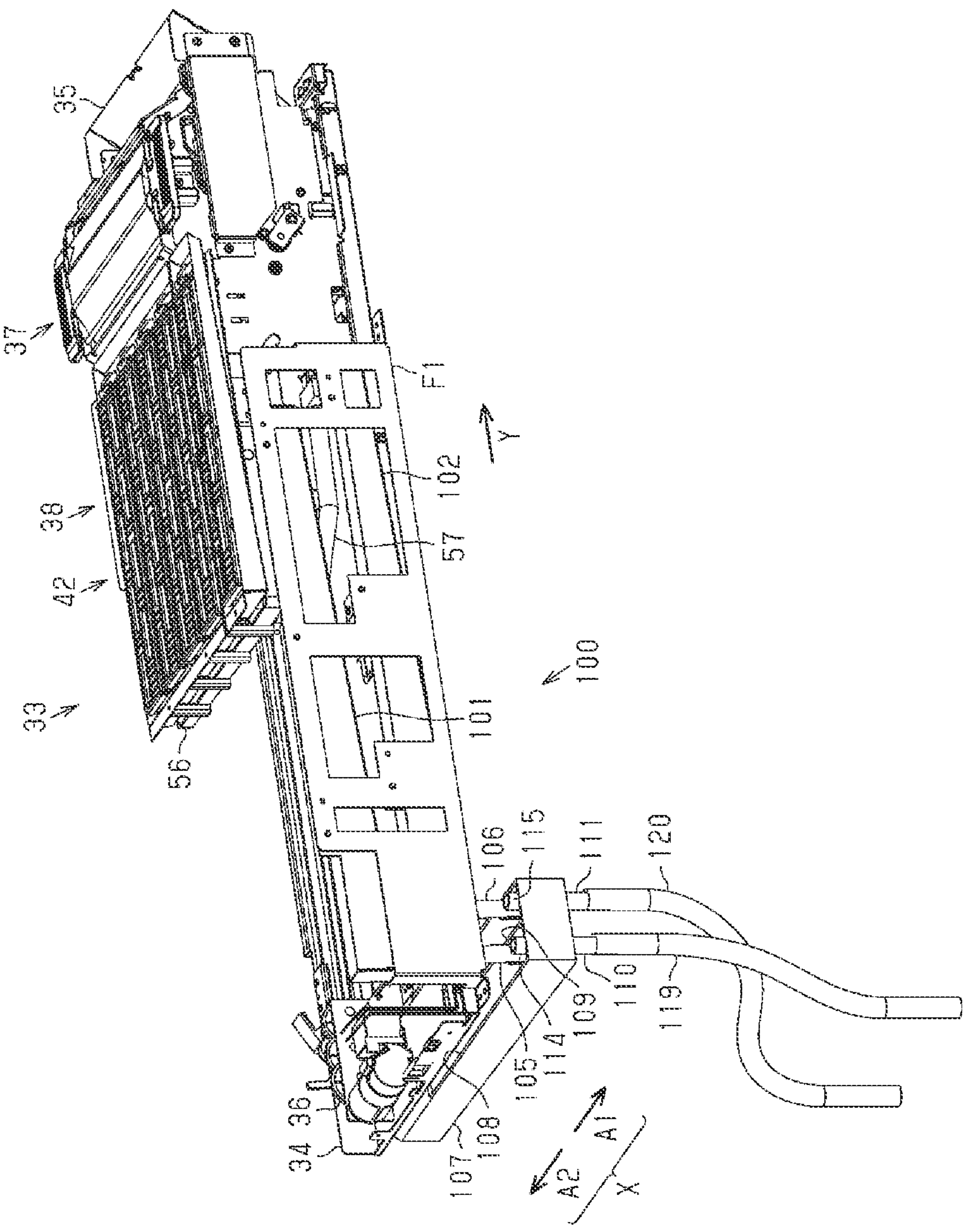
FIG. 13 is a perspective view illustrating a collecting unit.
Figure 14:
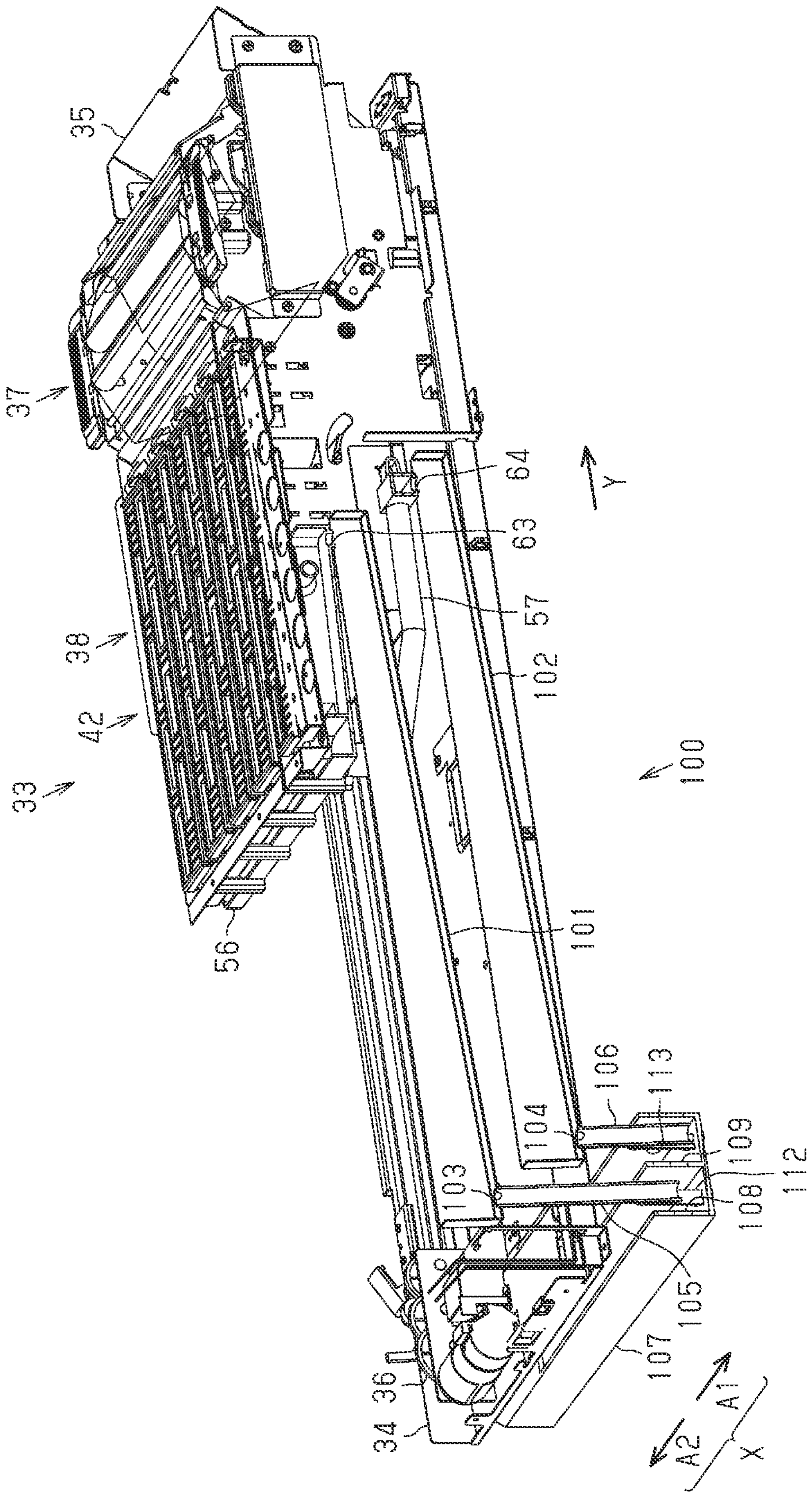
FIG. 14 is a cross-sectional perspective view of a discharging gutter.
Figure 15:
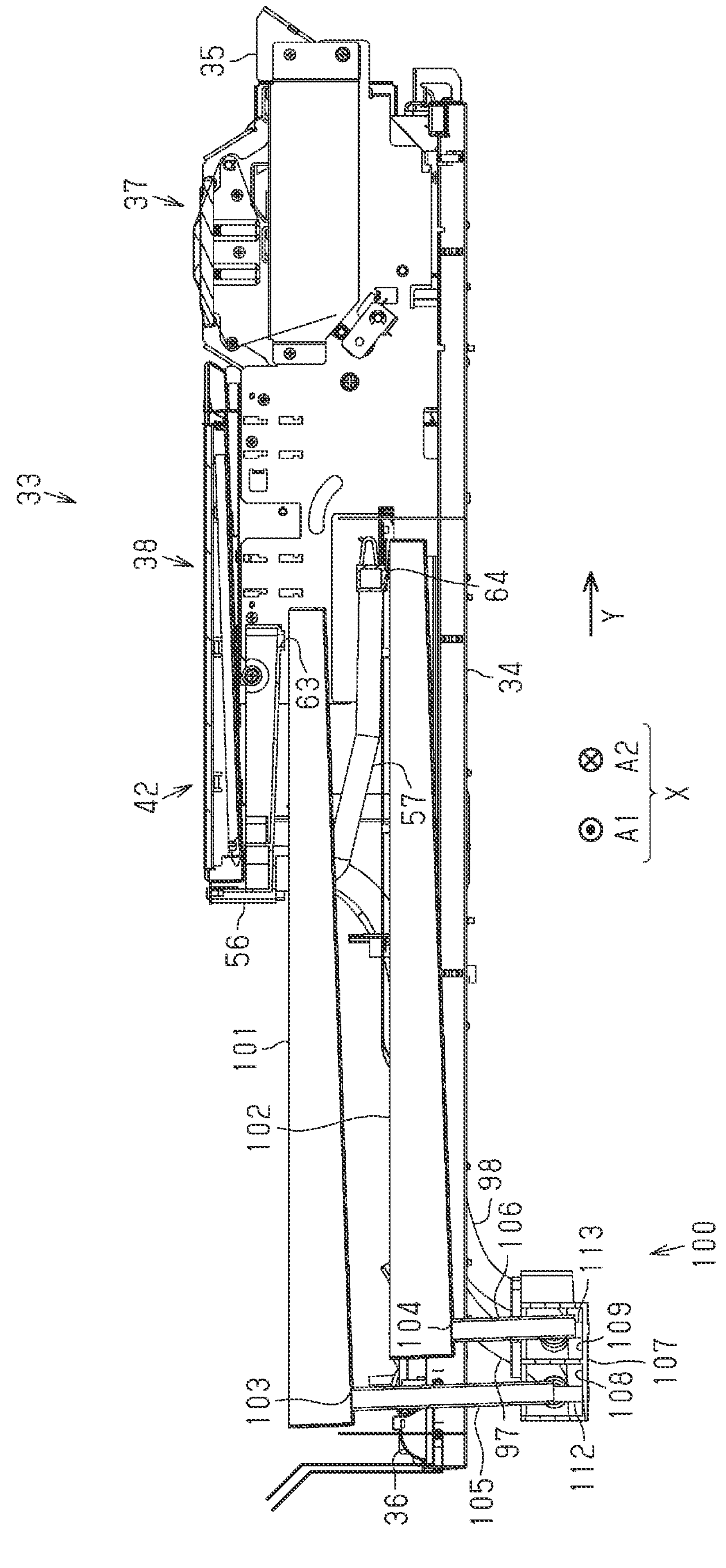
FIG. 15 is a cross-sectional view of the discharging gutter.

As illustrated in FIG. 13, FIG. 14, and FIG. 15, the collecting unit 100 includes one or more discharging gutters. The collecting unit 100 includes a first discharging gutter 101 and a second discharging gutter 102. The discharging gutter is a member that receives the liquid dropped through the discharging hole. The first discharging gutter 101 receives the liquid dropped through the first discharging hole 63. The second discharging gutter 102 receives the liquid dropped through the second discharging hole 64. The discharging gutter directs the liquid received to the waste liquid storage unit. The first discharging gutter 101 directs the liquid received to the first waste liquid storage unit 31. The second discharging gutter 102 directs the liquid received to the second waste liquid storage unit 32.

An outflow hole is open in the discharging gutter. A first outflow hole 103 is open in the first discharging gutter 101. A second outflow hole 104 is open in the second discharging gutter 102. The liquid received by the discharging gutter flows from the discharging gutter to the waste liquid storage unit through the outflow hole. The discharging gutter is inclined downward to the outflow hole. With this, the liquid received by the discharging gutter easily flows to the outflow hole.

The discharging gutter extends in the one direction. Specifically, the discharging gutter extends in the direction in which the wiping unit 37 and the receiving unit 38 move. In one example, the discharging gutter extends in the transport direction Y. The first discharging gutter 101 and the second discharging gutter 102 extend in the transport direction Y. With this, even when the moving body 35 moves in the transport direction Y, the discharging gutter is located directly below the discharging hole. In other words, regardless of the position of the moving body 35, the discharging gutter overlaps with the discharging hole as viewed in the vertical direction. In other words, the discharging gutter overlaps with a moving region of the discharging hole as viewed in the vertical direction. The moving region of the discharging hole is a region indicating a track of the discharging hole moving in the one direction. The first discharging gutter 101 overlaps with the first discharging hole 63 as viewed in the vertical direction. The second discharging gutter 102 overlaps with the second discharging hole 64 as viewed in the vertical direction. Thus, regardless of the moving body 35, the discharging gutter is capable of receiving the liquid through the discharging hole.

When the discharging gutter receives the liquid received by the receiving unit 38, a risk that a flow of the liquid received by the receiving unit 38 stagnates is reduced. In a case in which the receiving unit 38 and the waste liquid storage unit are hypothetically coupled to each other via a tube, when the receiving unit 38 moves together with the wiping unit 37, the tube is deformed. When the tube is deformed, there may be a risk that a flow of the liquid received by the receiving unit 38 stagnates. In particular, after the receiving unit 38 receives the liquid discharged by cleaning, the moving body 35 moves for wiping. Thus, the discharging gutter receives the liquid dropped from the receiving unit 38. With this, even when the moving body 35 moves in the one direction, a risk that a flow of the liquid received by the receiving unit 38 stagnates is reduced.

The first discharging gutter 101 is located to overlap with at least a part of the second discharging gutter 102 as viewed in the vertical direction. With this, a foot space of the collecting unit 100 is reduced. In one example, the first discharging gutter 101 is located above the second discharging gutter 102. In the vertical direction, the second discharging hole 64 is located between the first discharging gutter 101 and the second discharging gutter 102. With this, a risk that the first discharging gutter 101 receives the liquid dropped through the second discharging hole 64 is reduced. The first discharging gutter 101 may be located below the second discharging gutter 102. The first discharging gutter 101 and the second discharging gutter 102 may be arrayed in the scanning direction X.

The discharging gutter is attached to an attachment frame F1. The attachment frame F1 is located between the receiving unit 38 and the cap unit 68 in the scanning direction X. The attachment frame F1 extends vertically. The first discharging gutter 101 and the second discharging gutter 102 are attached to the attachment frame F1 to be arrayed in the vertical direction.

As illustrated in FIG. 4, the discharging gutter is located to overlap with at least a part of the receiver 42 as viewed in the vertical direction. The discharging gutter overlaps with at least a part of a moving region of the receiver 42 as viewed in the vertical direction. The moving region of the receiver 42 is a region indicating a track of the receiver 42 moving in the one direction. In other words, in the process in which the receiving unit 38 moves together with the wiping unit 37 in the one direction, the discharging gutter overlaps with the receiver 42 in the vertical direction. Specifically, the first discharging gutter 101 is located to overlap with at least a part of the second receiving tank 46 as viewed in the vertical direction. The second discharging gutter 102 is located to overlap with at least a part of the second receiving tank 46 as viewed in the vertical direction. Any one of the first discharging gutter 101 and the second discharging gutter 102 may be located so as to overlap with at least a part of the second receiving tank 46 in the vertical direction. The first discharging gutter 101 may be located so as to overlap with at least a part of the first receiving tank 45 as viewed in the vertical direction. The second discharging gutter 102 may be located so as to overlap with at least a part of the first receiving tank 45 as viewed in the vertical direction. With this, a foot space of the collecting unit 100 is reduced.

As illustrated in FIG. 13, FIG. 14, and FIG. 15, the collecting unit 100 may include one or more coupling tubes. The collecting unit 100 may include a first coupling tube 105 and a second coupling tube 106. The coupling tube is coupled to the discharging gutter. The first coupling tube 105 communicates with the first outflow hole 103. The second coupling tube 106 communicates with the second outflow hole 104. The liquid received by the discharging gutter flows in the coupling tube through the outflow hole. Due to the coupling tube, the liquid received by the discharging gutter can easily be guided to the waste liquid storage unit.

The collecting unit 100 may include a gathering gutter 107. The gathering gutter 107 is a gutter that gathers the liquid received by the receiving unit 38 and the liquid received by the cap unit 66. In other words, the gathering gutter 107 gathers the liquid received by the discharging gutter and the liquid received by the cap unit 66. The gathering gutter 107 receives the liquid from the discharging gutter. The gathering gutter 107 receives the liquid from the cap unit 66. With this, the liquid is gathered in the gathering gutter 107. The gathering gutter 107 directs the liquid being gathered, to the waste liquid storage unit.

The gathering gutter 107 gathers the liquid received by the first receiving tank 45 and the liquid received by the first cap 71. In other words, the gathering gutter 107 gathers the liquid received by the first discharging gutter 101 and the liquid received by the first cap 71. In one example, the gathering gutter 107 gathers the liquid received by the first discharging gutter 101, the liquid received by the first cap 71, and the liquid received by the third cap 73. The gathering gutter 107 directs the liquid to the first waste liquid storage unit 31.

The gathering gutter 107 gathers the liquid received by the second receiving tank 46 and the liquid received by the second cap 72. In other words, the gathering gutter 107 gathers the liquid received by the second discharging gutter 102 and the liquid received by the second cap 72. The gathering gutter 107 directs the liquid to the second waste liquid storage unit 32.

The gathering gutter 107 overlaps with at least a part of a moving region of the receiving unit 38 as viewed in the vertical direction. The moving region of the receiving unit 38 is a region indicating a track of the receiving unit 38 moving in the one direction. In other words, in the process in which the receiving unit 38 moves together with the wiping unit 37 in the one direction, the gathering gutter 107 overlaps with the receiving unit 38 in the vertical direction. Specifically, the gathering gutter 107 is located to overlap with at least a part of the receiving unit 38 as viewed in the vertical direction. The gathering gutter 107 is located to overlap with at least a part of the first receiving tank 45 as viewed in the vertical direction. The gathering gutter 107 is located to overlap with at least a part of the second receiving tank 46. In other words, when the receiving unit 38 moves in the one direction, the receiving unit 38 moves to a position overlapping with at least a part of the gathering gutter 107 as viewed in the vertical direction. In one example, the gathering gutter 107 is located below the base frame 34. With this, a foot space of the collecting unit 100 is reduced.

In the gathering gutter 107, one or more gathering paths are defined. In one example, in the gathering gutter 107, a first gathering path 108 and a second gathering path 109 are defined. For example, the gathering path is a groove. The first liquid flows in the first gathering path 108. In one example, the first liquid and the third liquid flow in the first gathering path 108. The second liquid flows in the second gathering path 109. In one example, the first gathering path 108 and the second gathering path 109 extend in the scanning direction X.

The gathering gutter 107 includes one or more discharging tubes. In one example, the gathering gutter 107 includes a first discharging tube 110 and a second discharging tube 111. The discharging tube discharges the liquid from the gathering gutter 107. The liquid flows from the gathering gutter 107 to the waste liquid storage unit via the discharging tube. The discharging tube communicates with the gathering path. The first discharging tube 110 communicates with the first gathering path 108. The second discharging tube 111 communicates with the second gathering path 109.

The gathering gutter 107 receives the liquid from the discharging gutter to the gathering path. The gathering gutter 107 receives the liquid from the first discharging gutter 101 to the first gathering path 108. The gathering gutter 107 receives the liquid from the second discharging gutter 102 to the second gathering path 109. In one example, when the coupling tube is inserted into the gathering gutter 107, the gathering gutter 107 receives the liquid from the discharging gutter. The gathering gutter 107 may directly receive the liquid dropped through the outflow hole.

The gathering gutter 107 may include one or more guiding members. The gathering gutter 107 may include a first guiding member 112 and a second guiding member 113. The guiding member is a member that guides the coupling tube. The guiding member extends from the surface defining the gathering path in the gathering gutter 107. The guiding member contacts with the coupling tube to guide the coupling tube so that the end portion of the coupling tube is accommodated in the gathering path. The first guiding member 112 guides the first coupling tube 105 to the first gathering path 108. The second guiding member 113 guides the second coupling tube 106 to the second gathering path 109.

Figure 16:
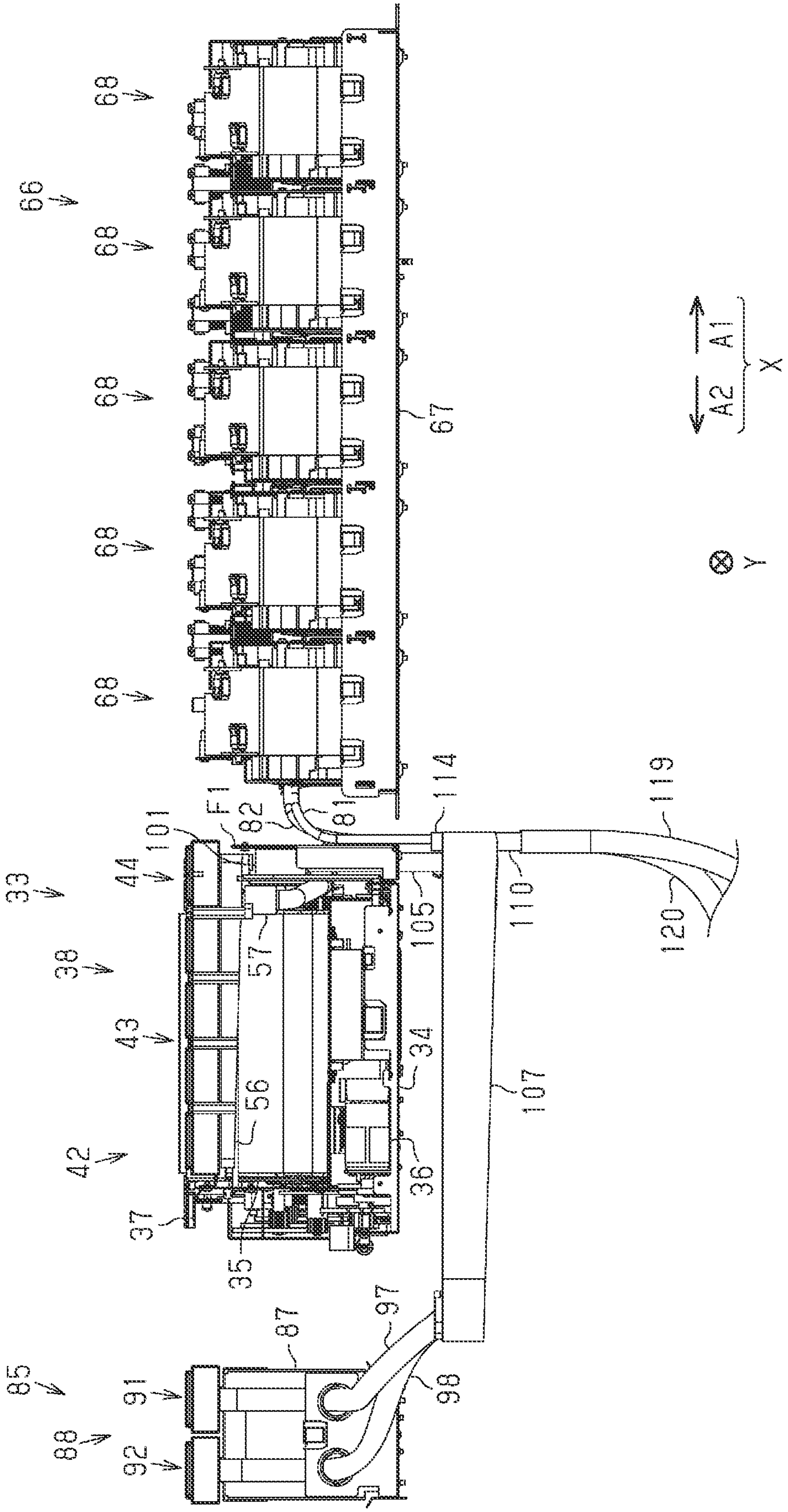
FIG. 16 is a front view of a gathering gutter.
Figure 17:
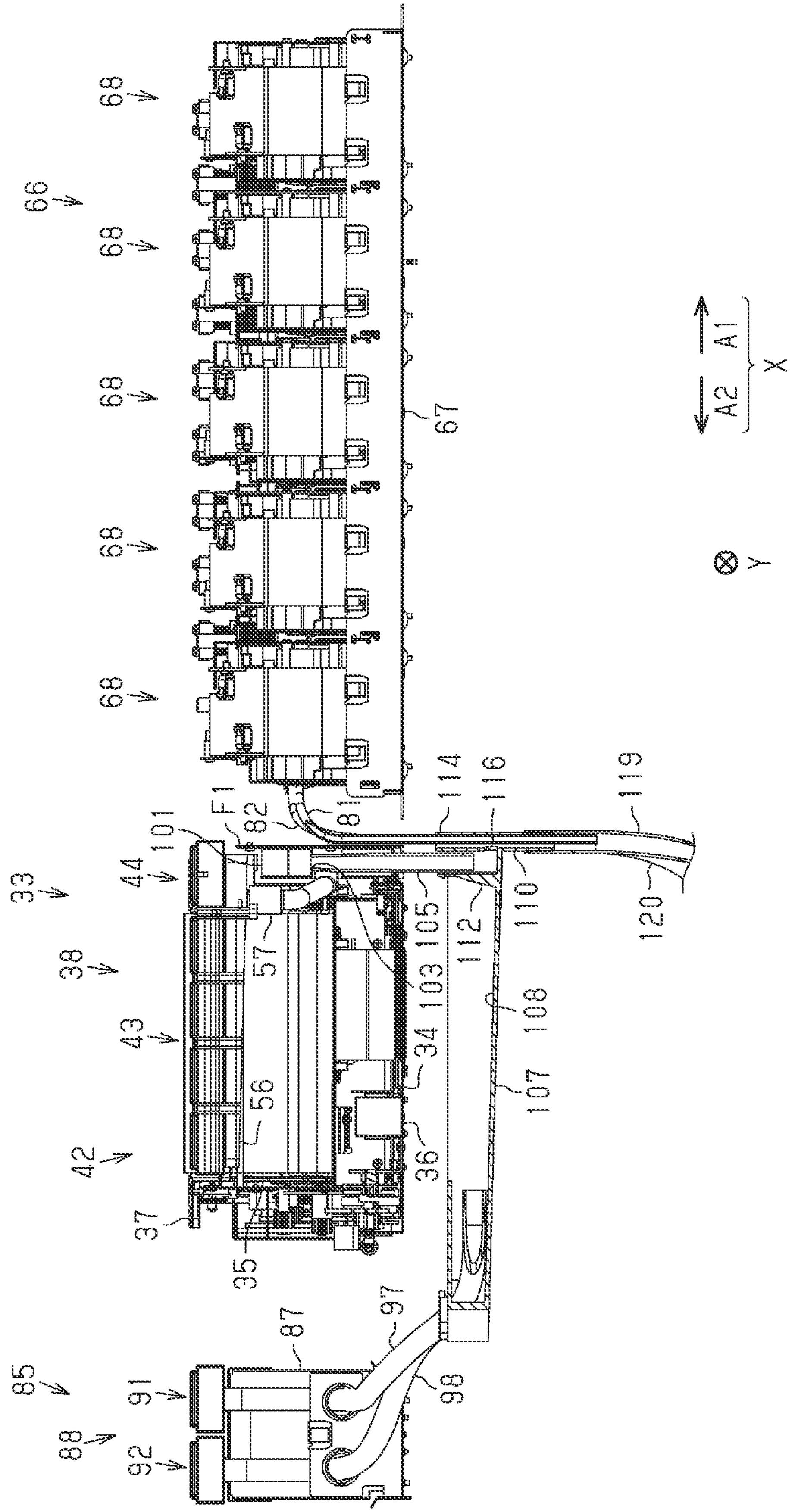
FIG. 17 is a cross-sectional view of the gathering gutter.

As illustrated in FIG. 16 and FIG. 17, the gathering gutter 107 receives the liquid from the cap unit 66. Specifically, the gathering gutter 107 receives the liquid from the cap discharging member to the gathering path. In other words, the gathering gutter 107 receives the liquid from the first cap discharging member 81 to the first gathering path 108. The gathering gutter 107 receives the liquid from the second cap discharging member 82 to the second gathering path 109. The cap discharging member is inserted into the gathering gutter 107. With this, the gathering gutter 107 receives the liquid from the cap unit 66. In one example, the cap discharging member is inserted into the discharging tube.

The gathering gutter 107 may include one or more inserting tubes. The gathering gutter 107 may include a first inserting tube 114 and a second inserting tube 115. The inserting tube is a tube into which the cap discharging member is inserted. The first cap discharging member 81 is inserted into the first inserting tube 114. The second cap discharging member 82 is inserted into the second inserting tube 115.

The inserting tube extends to communicate with the coupling tube. The first inserting tube 114 extends to communicate with the first discharging tube 110. The second inserting tube 115 extends to communicate with the second coupling tube 106. Thus, when the cap discharging member is inserted into the inserting tube, the inserting tube is capable of guiding the cap discharging member to the coupling tube. Therefore, the cap discharging member is easily inserted into the coupling tube.

A release port 116 is open in the inserting tube. In other words, the release port 116 is open in each of the first inserting tube 114 and the second inserting tube 115. The release port 116 is an opening for communicating the inside of the inserting tube with the gathering path. The two release ports 116 communicate the side of the first inserting tube 114 with the first gathering path 108 and the side of the second inserting tube 115 with the second gathering path 109, respectively. The liquid received from the discharging gutter and the liquid received from the flushing receiving unit 88 flow to the discharging tube through the release port 116.

As illustrated in FIG. 11, one or more gathering holes are open in the gathering gutter 107. In the gathering gutter 107, a first gathering hole 117 and a second gathering hole 118 are open. The gathering hole communicates with the gathering path. The first gathering hole 117 communicates with the first gathering path 108. The second gathering hole 118 communicates with the second gathering path 109. In one example, the flushing discharging member is inserted into the gathering hole. The first flushing discharging member 97 is inserted into the first gathering hole 117. The second flushing discharging member 98 is inserted into the second gathering hole 118. With this, the gathering gutter 107 receives the liquid from the first flushing unit 85.

As illustrated in FIG. 16 and FIG. 17, the collecting unit 100 includes one or more discharging members. The collecting unit 100 includes a first discharging member 119 and a second discharging member 120. The discharging member is coupled to the gathering gutter 107 and the waste liquid storage unit. The liquid flows from the gathering gutter 107 to the waste liquid storage unit via the discharging member. For example, the discharging member is a tube. The first discharging member 119 is coupled to the first discharging tube 110. The second discharging member 120 is coupled to the second discharging tube 111.

The cap discharging member may be inserted into the discharging member. In one example, the first cap discharging member 81 is inserted into the first discharging member 119 via the first inserting tube 114 and the first discharging tube 110. The second cap discharging member 82 is inserted into the second discharging member 120 via the second inserting tube 115 and the second discharging tube 111.

Bubbles are easily mixed in the liquid that is fed from the cap unit 66 to the gathering gutter 107. This is because the liquid is fed by the pump from the cap. When the cap discharging member is inserted into the discharging member, bubbles fed from the cap accumulates inside the discharging member. With this, a risk that bubbles overflow from the gathering gutter 107 is reduced.

Actions and Effects

Next, actions and effects of the example described above are described.

(1) The collecting unit 100 includes the discharging gutter that receives the liquid dropped through the discharging hole and directs the liquid to the waste liquid storage unit. The discharging gutter extends in the one direction. With the configuration described above, even when the receiving unit 38 moves together with the wiping unit 37 in the transport direction Y, the discharging gutter is capable of receiving the liquid dropped through the discharging hole. Therefore, as compared to a case in which the receiving unit 38 and the collecting unit 100 are coupled to each other via a tube, for example, a flow of the liquid received by the receiving unit 38 is less likely to stagnate.

(2) The collecting unit 100 includes the gathering gutter 107 that gathers the liquid received by the cap unit 66 and the liquid received by the discharging gutter. The gathering gutter 107 directs the liquid to the waste liquid storage unit. With the configuration described above, the liquid received by the receiving unit 38 and the liquid received by the cap unit 66 flow to the waste liquid storage unit that is commonly shared. Therefore, as compared to a case in which the liquid flows to separate waste liquid storage units, the number of waste liquid storage units can be reduced.

(3) The gathering gutter 107 overlaps with at least a part of the receiving unit 38 that moves in the one direction as viewed in the vertical direction. With the configuration described above, as compared to a configuration in which the gathering gutter 107 does not overlap with the receiving unit 38, a foot space of the collecting unit 100 is reduced.

(4) The collecting unit 100 includes the first discharging gutter 101 that receives the first liquid dropped through the first discharging hole 63 and directs the first liquid to the first waste liquid storage unit 31. The collecting unit 100 includes the second discharging gutter 102 that receives the second liquid dropped through the second discharging hole 64 and directs the second liquid to the second waste liquid storage unit 32. With the configuration described above, the first liquid and the second liquid are collected separately. With this, a risk of reaction between the first liquid and the second liquid in the receiving unit 38 is reduced. Therefore, a flow of the liquid received by the receiving unit 38 is less likely to stagnate.

(5) The first discharging gutter 101 overlaps with at least a part of the second discharging gutter 102 as viewed in the vertical direction. With the configuration described above, as compared to a configuration in which the first discharging gutter 101 does not overlap with the second discharging gutter 102, a foot space of the collecting unit 100 is reduced.

(6) The second discharging hole 64 is located between the first discharging gutter 101 and the second discharging gutter 102 in the vertical direction. With the configuration described above, a risk that the first discharging gutter 101 receives the liquid dropped through the second discharging hole 64 is reduced.

(7) The gathering gutter 107 gathers the first liquid received by the first cap 71 and the first liquid received by the first discharging gutter 101, and gathers the second liquid received by the second cap 72 and the second liquid received by the second discharging gutter 102. The gathering gutter 107 directs the first liquid to the first waste liquid storage unit 31, and directs the second liquid to the second waste liquid storage unit 32. With the configuration described above, the first liquid received by the first receiving tank 45 and the first liquid received by the first cap 71 flow to the first waste liquid storage unit 31 that is commonly shared. Therefore, as compared to a case in which the first liquid flows to the separate first waste liquid storage units 31, the number of first waste liquid storage units 31 can be reduced. Further, the second liquid received by the second receiving tank 46 and the second liquid received by the second cap 72 flow to the second waste liquid storage unit 32 that is commonly shared. Therefore, as compared to a case in which the liquid flows to the separate second waste liquid storage units 32, the number of second waste liquid storage units 32 can be reduced.

Modification Example

The example described above may be modified for implementation as follows. The example described above and the following modification example may be combined with each other for implementation in so far as these examples are not technically inconsistent.

Figure 18:
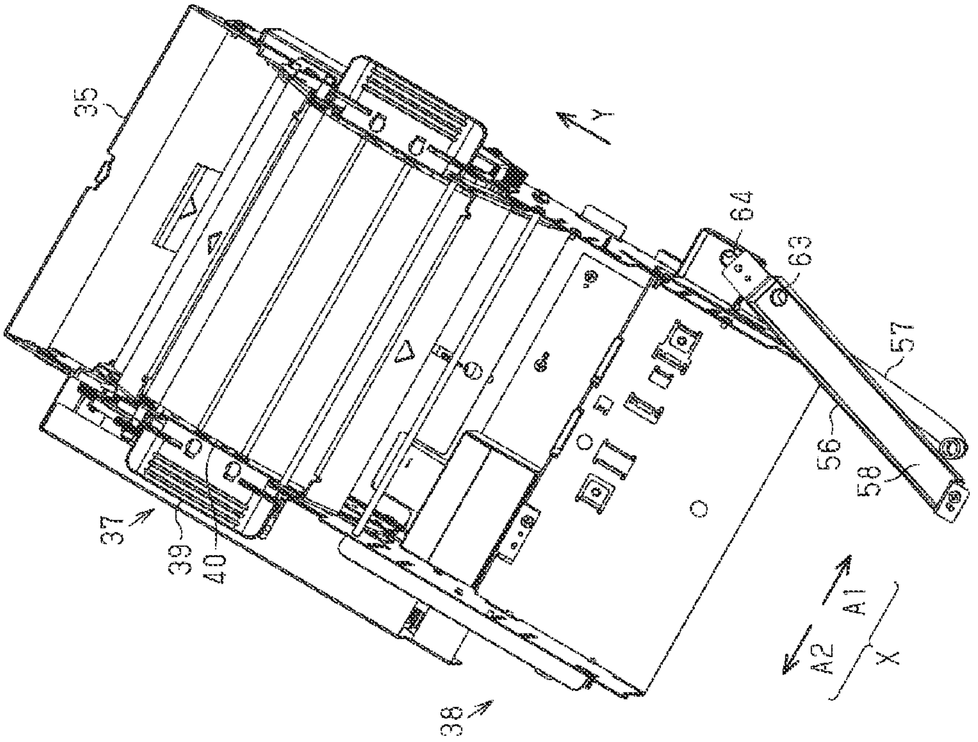
FIG. 18 is a perspective view illustrating a modification example of the receiving gutters.
Figure 19:
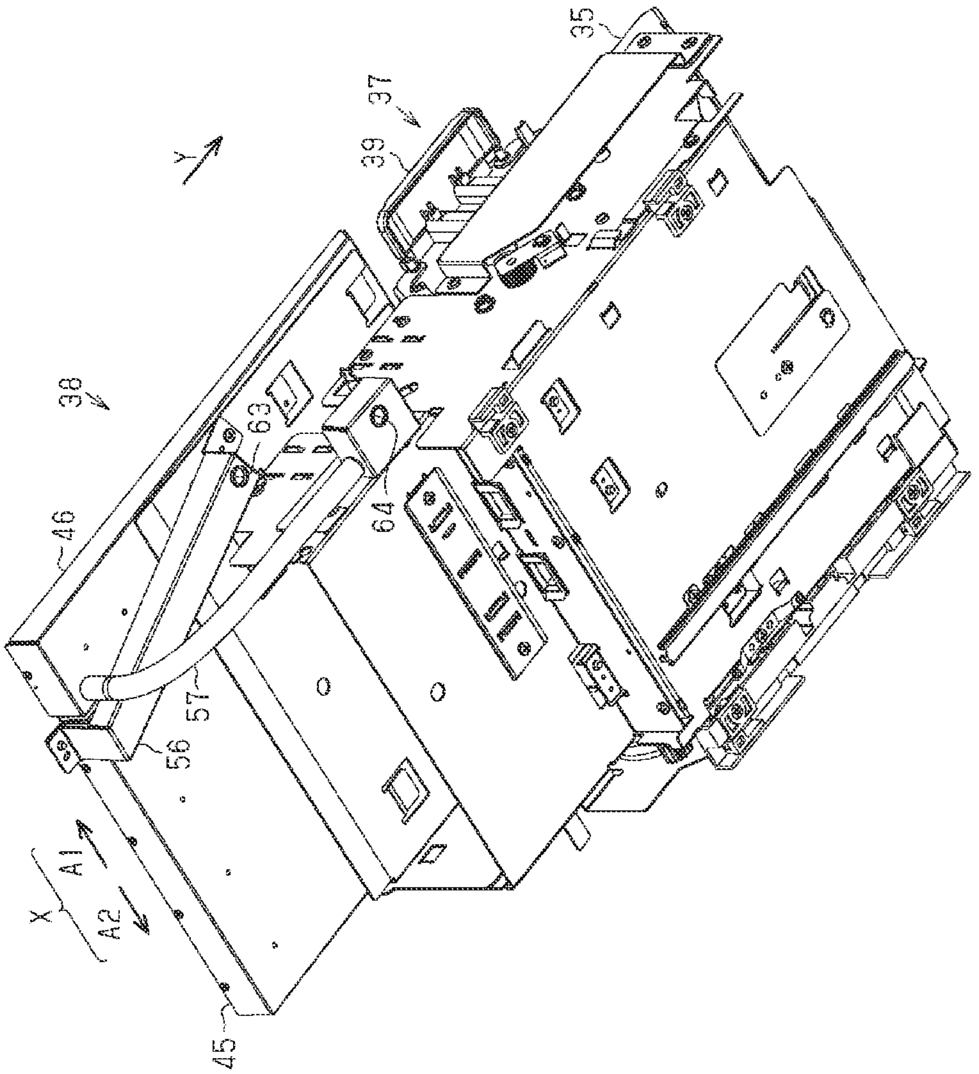
FIG. 19 is a perspective view as viewed from an angle different from FIG. 18.
Figure 20:
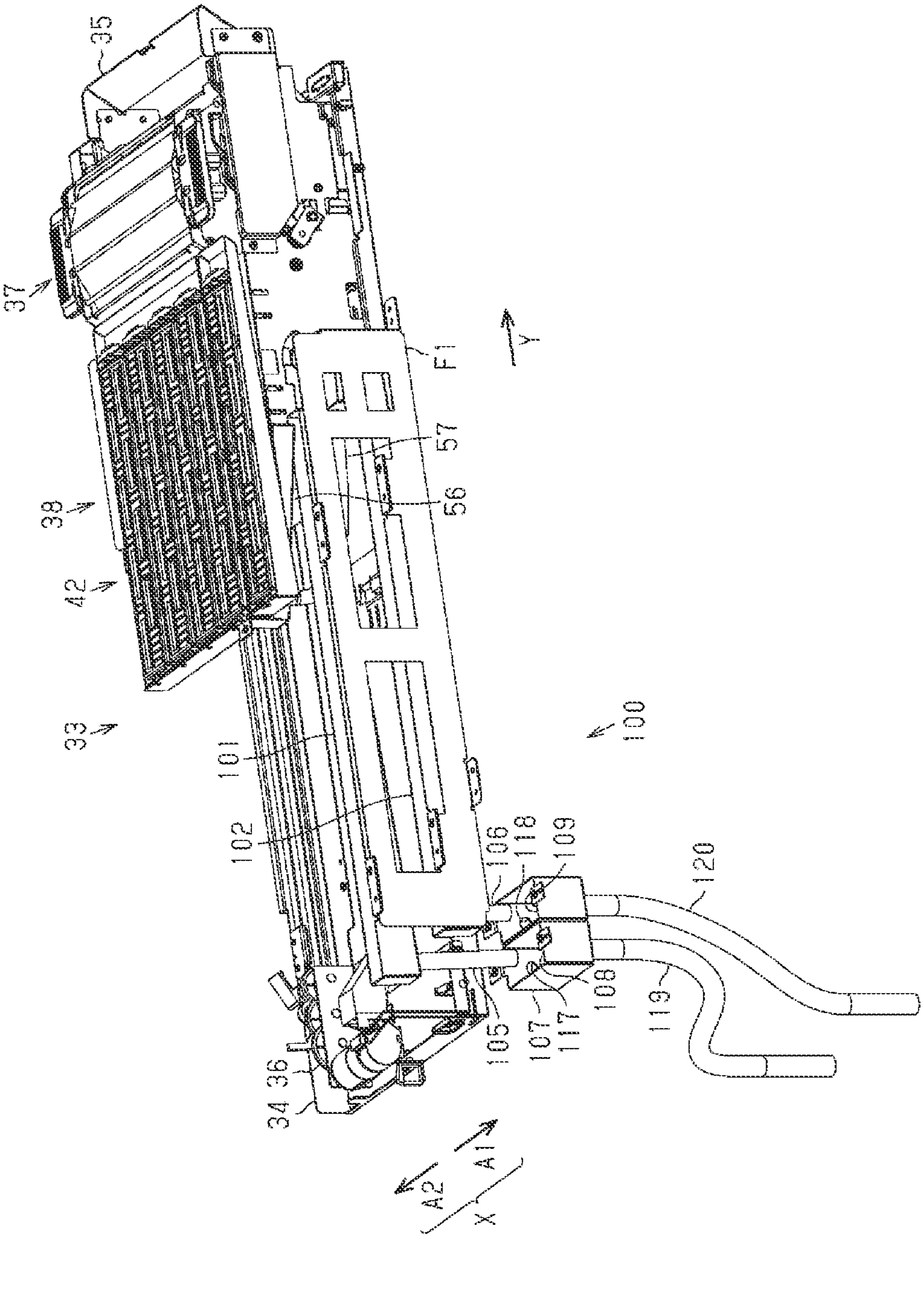
FIG. 20 is a perspective view illustrating a modification example of the gathering gutter.
Figure 21:
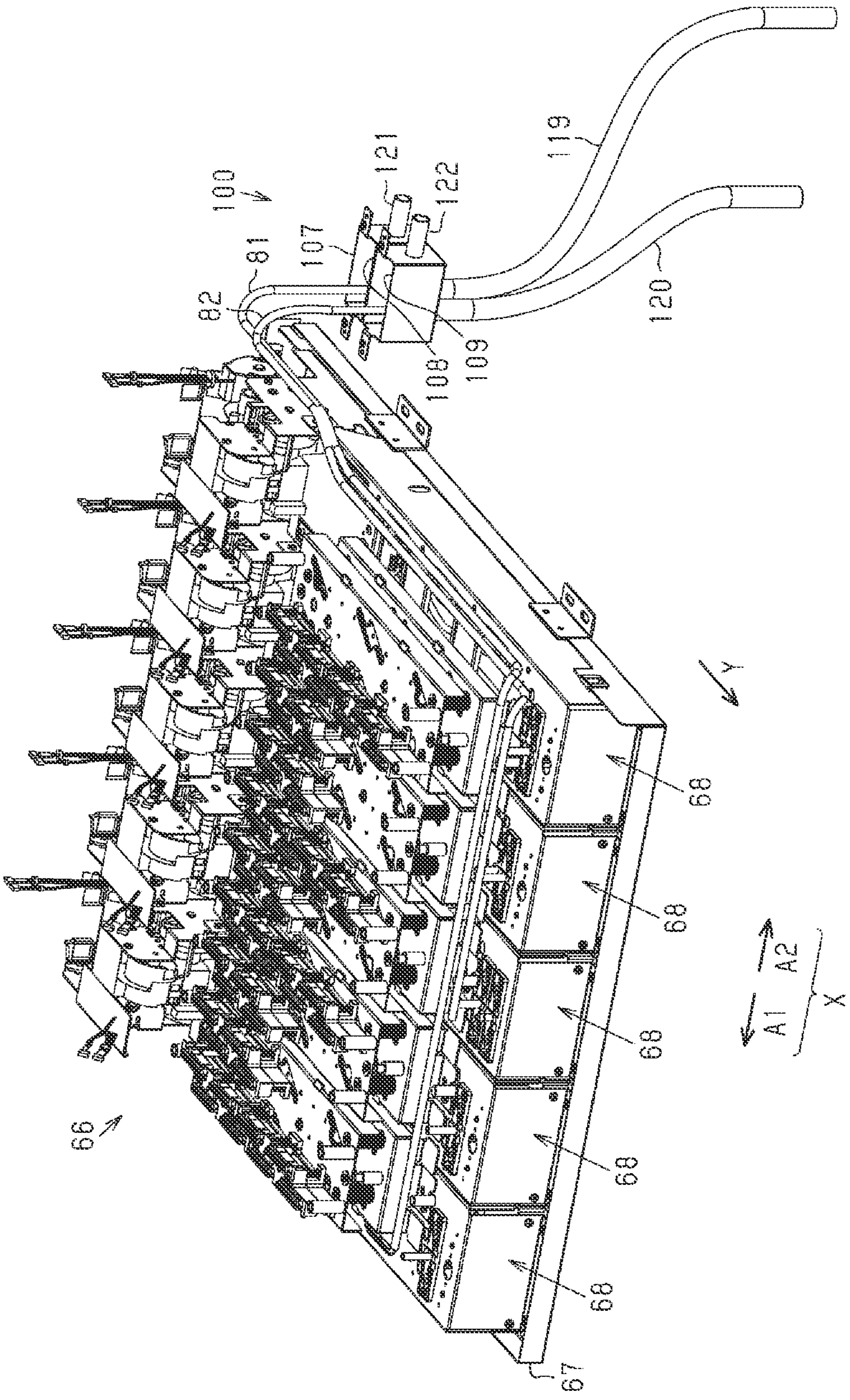
FIG. 21 is a perspective view as viewed from an angle different from FIG. 20.
Figure 22:
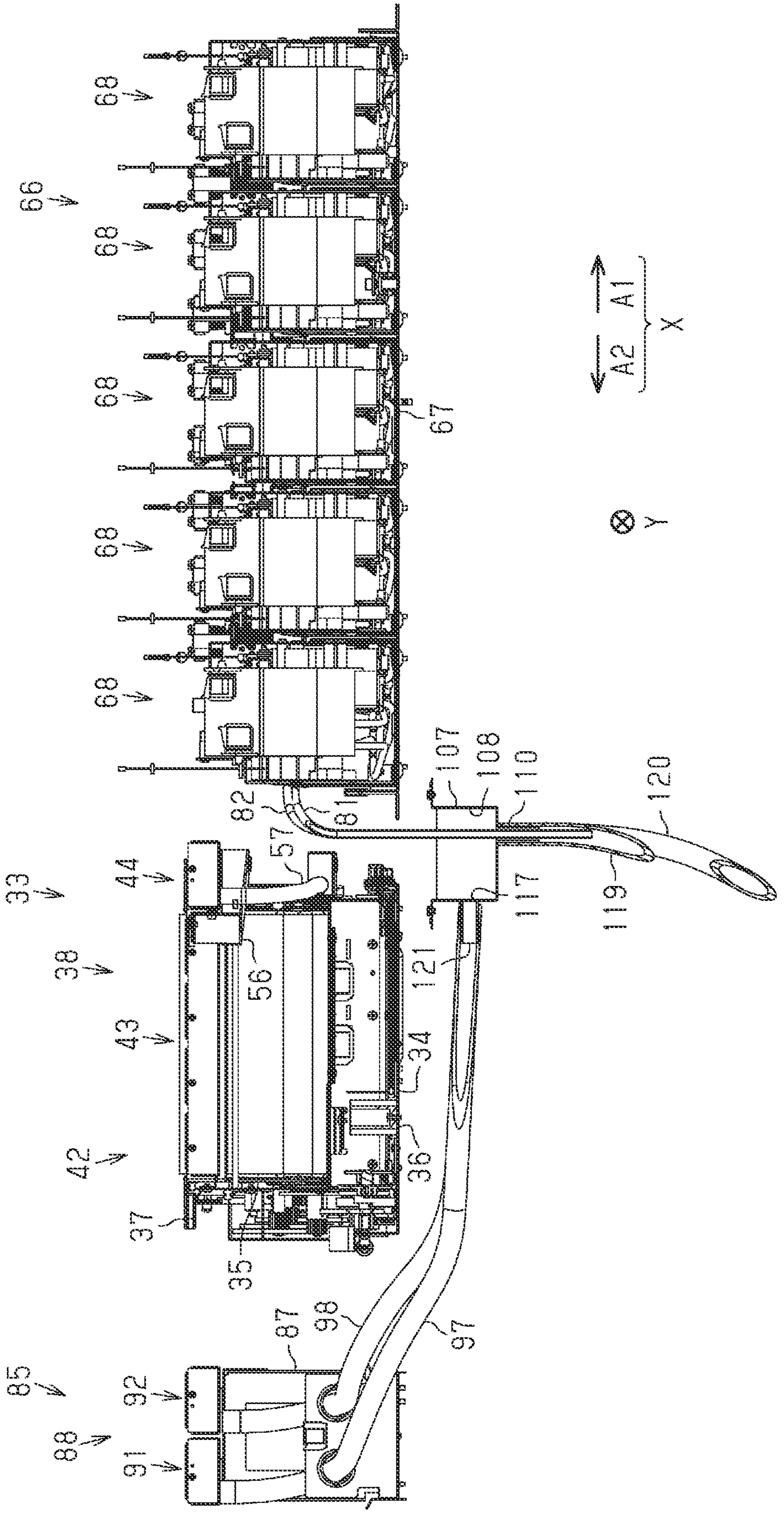
FIG. 22 is a cross-sectional view illustrating a modification example of the gathering gutter.

- As illustrated in FIG. 18 and FIG. 19, the receiving gutter may be changed. For example, the shape of the first receiving gutter 56 is not limited to an L-like shape, and may be an I-like shape. In this modification example, the first receiving gutter 56 only includes the first receiving region 58, and does not include the second receiving region 59. The second receiving gutter 57 receives the liquid directly from the second receiving tank 46.
- As illustrated in FIG. 20, FIG. 21, and FIG. 22, the gathering gutter 107 may be changed. For example, the gathering gutter 107 may include one or more gathering tubes. The gathering gutter 107 includes a first gathering tube 121 and a second gathering tube 122. The gathering tube communicates with the gathering hole. The first gathering tube 121 communicates with the first gathering hole 117. The second gathering tube 122 communicates with the second gathering hole 118. The gathering tube is coupled to the flushing discharging member. The first gathering tube 121 is coupled to the first flushing discharging member 97. The second gathering tube 122 is coupled to the second flushing discharging member 98. With this, the gathering gutter 107 receives the liquid from the first flushing unit 85. In this modification example, the gathering gutter 107 does not include a guiding member and an inserting tube.
- The collecting unit 100 may include a plurality of gathering gutters 107. For example, the collecting unit 100 may include the gathering gutter 107 that gathers the first liquid and the gathering gutter 107 that gathers the second liquid.

Technical Spirit

Hereinafter, technical ideas understood from the above-described example and modification example, and actions and effects thereof are described.

(A) A liquid ejecting device on which a waste liquid storage unit is mounted includes an ejecting unit including a nozzle surface in which a nozzle is open and being configured to eject a liquid from the nozzle, a maintenance unit configured to perform maintenance to the ejecting unit, and a collecting unit configured to collect the liquid from the maintenance unit, wherein the maintenance unit includes a receiving unit configured to receive the liquid discharged from the nozzle, and a wiping unit configured to wipe the nozzle surface by moving together with the receiving unit in one direction, the receiving unit includes a receiver including a receiving tank configured to receive the liquid discharged from the nozzle, and a receiving gutter in which a discharging hole for dropping the liquid received by the receiving tank onto the collecting unit is open, the collecting unit includes a discharging gutter configured to receive the liquid dropped through the discharging hole and direct the liquid to the waste liquid storage unit, and the discharging gutter extends in the one direction and overlaps with at least a part of the receiver as viewed in a vertical direction. With the configuration described above, even when the receiving unit moves together with the wiping unit in the one direction, the discharging gutter is capable of receiving the liquid dropped through the discharging hole because the discharging gutter extends in the one direction. Therefore, as compared to a case in which the receiving unit and the collecting unit are coupled to each other via a tube, for example, a flow of the liquid received by the receiving unit is less likely to stagnate.

(B) In the liquid ejecting device described above, the maintenance unit may include a cap unit that includes a cap being configured to contact with the ejecting unit to form a space communicating with the nozzle and a pump configured to perform suctioning inside the cap, the collecting unit may include a gathering gutter configured to gather the liquid received by the cap unit and the liquid received by the discharging gutter, and the gathering gutter may direct the liquid to the waste liquid storage unit. With the configuration described above, the liquid received by the receiving unit and the liquid received by the cap unit flow to the commonly-shared waste liquid storage unit. Therefore, as compared to a case in which the liquid flows to separate waste liquid storage units, the number of waste liquid storage units can be reduced.

(C) In the liquid ejecting device described above, the gathering gutter may overlap with at least a part of the receiving unit moving in the one direction as viewed in the vertical direction. With the configuration described above, as compared to a configuration in which the gathering gutter does not overlap with the receiving unit, a foot space of the collecting unit is reduced.

(D) In the liquid ejecting device described above, the waste liquid storage unit may be a first waste liquid storage unit, the liquid ejecting device may be a liquid ejecting device on which the first waste liquid storage unit and a second waste liquid storage unit are mounted, the receiving tank may be a first receiving tank, the receiving gutter may be a first receiving gutter, the discharging hole may be a first discharging hole, the discharging gutter may be a first discharging gutter, the liquid ejected from the nozzle may be a first liquid or a second liquid that reacts with the first liquid, the nozzle may be one of a plurality of nozzles, and the plurality of nozzles may include a first nozzle configured to eject the first liquid and a second nozzle configured to eject the second liquid, the nozzle surface may be a first nozzle surface, the ejecting unit may include the first nozzle surface in which the first nozzle is open, and a second nozzle surface in which the second nozzle is open, the receiving unit may include the receiver including the first receiving tank configured to receive the first liquid discharged from the first nozzle and a second receiving tank configured to receive the second liquid discharged from the second nozzle, the first receiving gutter in which the first discharging hole for dropping the first liquid received by the first receiving tank onto the collecting unit is open, and a second receiving gutter in which a second discharging hole for dropping the second liquid received by the second receiving tank onto the collecting unit is open, and the collecting unit may include the first discharging gutter configured to receive the first liquid dropped through the first discharging hole and direct the first liquid to the first waste liquid storage unit, and a second discharging gutter configured to receive the second liquid dropped through the second discharging hole and direct the second liquid to the second waste liquid storage unit. With the configuration described above, the first liquid and the second liquid are collected separately. With this, a risk of reaction between the first liquid and the second liquid in the receiving unit is reduced. Therefore, a flow of the liquid received by the receiving unit is less likely to stagnate.

(E) In the liquid ejecting device described above, the first discharging gutter may overlap with at least a part of the second discharging gutter as viewed in the vertical direction. With the configuration described above, as compared to a configuration in which the first discharging gutter does not overlap with the second discharging gutter, a foot space of the collecting unit is reduced.

(F) In the liquid ejecting device described above, the second discharging hole may be located between the first discharging gutter and the second discharging gutter in the vertical direction. With the configuration described above, a risk that the first discharging gutter receives the second liquid dropped through the second discharging hole can be reduced.

(G) In the liquid ejecting device described above, the maintenance unit may include a cap unit including a first cap configured to contact with the ejecting unit to form a space communicating with the first nozzle, a second cap configured to contact with the ejecting unit to form a space communicating with the second nozzle, a first pump configured to perform suctioning inside the first cap, and a second pump configured to perform suctioning inside the second cap, the collecting unit may include a gathering gutter configured to gather the first liquid received by the first cap and the first liquid received by the first discharging gutter and gather the second liquid received by the second cap and the second liquid received by the second discharging gutter, and the gathering gutter may direct the first liquid to the first waste liquid storage unit and direct the second liquid to the second waste liquid storage unit. With the configuration described above, the first liquid received by the first receiving tank and the first liquid received by the first cap flow to the first waste liquid storage unit that is commonly shared. Therefore, as compared to a case in which the first liquid flows to separate first waste liquid storage units, the number of first waste liquid storage units can be reduced. Further, the second liquid received by the second receiving tank and the second liquid received by the second cap flow to the second waste liquid storage unit that is commonly shared. Therefore, as compared to a case in which the liquid flows to separate second waste liquid storage units, the number of second waste liquid storage units can be reduced.

What is claimed is:

1. A liquid ejecting device on which a waste liquid storage unit is mounted, the liquid ejecting device comprising:
- an ejecting unit including a nozzle surface in which a nozzle is open and being configured to eject a liquid from the nozzle;
- a maintenance unit configured to perform maintenance to the ejecting unit; and
- a collecting unit configured to collect the liquid from the maintenance unit, wherein
- the maintenance unit includes:
  - a receiving unit configured to receive the liquid discharged from the nozzle; and
  - a wiping unit configured to wipe the nozzle surface by moving together with the receiving unit in one direction,
- the receiving unit includes:
  - a receiver including a receiving tank configured to receive the liquid discharged from the nozzle; and
  - a receiving gutter in which a discharging hole for dropping the liquid received by the receiving tank onto the collecting unit is open,
- the collecting unit includes a discharging gutter configured to receive the liquid dropped through the discharging hole and direct the liquid to the waste liquid storage unit, and
- the discharging gutter extends in the one direction and overlaps with at least a part of the receiver as viewed in a vertical direction.

2. The liquid ejecting device according to claim 1, wherein
- the maintenance unit includes a cap unit that includes a cap being configured to contact with the ejecting unit to form a space communicating with the nozzle and a pump configured to perform suctioning inside the cap,
- the collecting unit includes a gathering gutter configured to gather the liquid received by the cap unit and the liquid received by the discharging gutter, and
- the gathering gutter directs the liquid to the waste liquid storage unit.

3. The liquid ejecting device according to claim 2, wherein the gathering gutter overlaps with at least a part of the receiving unit moving in the one direction as viewed in the vertical direction.

4. The liquid ejecting device according to claim 1, wherein the waste liquid storage unit is a first waste liquid storage unit, the liquid ejecting device is a liquid ejecting device on which the first waste liquid storage unit and a second waste liquid storage unit are mounted, the receiving tank is a first receiving tank, the receiving gutter is a first receiving gutter, the discharging hole is a first discharging hole, the discharging gutter is a first discharging gutter, the liquid ejected from the nozzle is a first liquid or a second liquid that reacts with the first liquid, the nozzle is one of a plurality of nozzles, and the plurality of nozzles includes a first nozzle configured to eject the first liquid and a second nozzle configured to eject the second liquid, the nozzle surface is a first nozzle surface, the ejecting unit includes:

the first nozzle surface in which the first nozzle is open; and a second nozzle surface in which the second nozzle is open, the receiving unit includes:

the receiver including the first receiving tank configured to receive the first liquid discharged from the first nozzle and a second receiving tank configured to receive the second liquid discharged from the second nozzle;

the first receiving gutter in which the first discharging hole for dropping the first liquid received by the first receiving tank onto the collecting unit is open; and a second receiving gutter in which a second discharging hole for dropping the second liquid received by the second receiving tank onto the collecting unit is open, and the collecting unit includes:

the first discharging gutter configured to receive the first liquid dropped through the first discharging hole and direct the first liquid to the first waste liquid storage unit; and a second discharging gutter configured to receive the second liquid dropped through the second discharging hole and direct the second liquid to the second waste liquid storage unit.

5. The liquid ejecting device according to claim 4, wherein the first discharging gutter overlaps with at least a part of the second discharging gutter as viewed in the vertical direction.

6. The liquid ejecting device according to claim 5, wherein the second discharging hole is located between the first discharging gutter and the second discharging gutter in the vertical direction.

7. The liquid ejecting device according to claim 4, wherein the maintenance unit includes a cap unit including a first cap configured to contact with the ejecting unit to form a space communicating with the first nozzle, a second cap configured to contact with the ejecting unit to form a space communicating with the second nozzle, a first pump configured to perform suctioning inside the first cap, and a second pump configured to perform suctioning inside the second cap, the collecting unit includes a gathering gutter configured to gather the first liquid received by the first cap and the first liquid received by the first discharging gutter and gather the second liquid received by the second cap and the second liquid received by the second discharging gutter, and the gathering gutter directs the first liquid to the first waste liquid storage unit, and directs the second liquid to the second waste liquid storage unit.

* * * * *